(12) United States Patent
Dessert et al.

(10) Patent No.: US 9,477,977 B2
(45) Date of Patent: *Oct. 25, 2016

(54) SYSTEM AND METHOD FOR PROVIDING A PERSONALIZED SHOPPING EXPERIENCE AND PERSONALIZED PRICING OF PRODUCTS AND SERVICES WITH A PORTABLE COMPUTING DEVICE

(71) Applicant: QUALCOMM INCORPORATED, San Diego, CA (US)

(72) Inventors: Robert L. Dessert, San Diego, CA (US); Robert Canterbury, Carlsbad, CA (US); Scott Monahan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/268,779

(22) Filed: May 2, 2014

(65) Prior Publication Data
US 2014/0239066 A1 Aug. 28, 2014

Related U.S. Application Data

(63) Continuation of application No. 13/365,424, filed on Feb. 3, 2012, now Pat. No. 9,027,827.

(60) Provisional application No. 61/586,900, filed on Jan. 16, 2012.

(51) Int. Cl.
*G06Q 40/00* (2012.01)
*G06Q 30/06* (2012.01)
(Continued)

(52) U.S. Cl.
CPC .......... *G06Q 30/0601* (2013.01); *G06Q 20/20* (2013.01); *G06Q 20/322* (2013.01); *G06Q 30/01* (2013.01); *G06Q 30/0207* (2013.01)

(58) Field of Classification Search
USPC ........................ 235/379, 380, 449, 454, 462; 705/14.16, 14.19, 14.53, 14.58, 14.64, 705/14.66, 26.1
See application file for complete search history.

(56) References Cited

U.S. PATENT DOCUMENTS 5,424,524 A  6/1995 Ruppert et al.
5,918,211 A * 6/1999 Sloane ............................ 705/16
(Continued)

OTHER PUBLICATIONS

International Search Report and Written Opinion—PCT/US2012/070475—ISA/EPO—Sep. 20, 2013.
(Continued)

*Primary Examiner* — Michael G Lee
*Assistant Examiner* — Tabitha Chedekel
(74) *Attorney, Agent, or Firm* — Nicholas A. Cole

(57) ABSTRACT

A system and method for providing a personalized shopping experience with a portable computing device ("PCD") are described. The system and method may include checking-in PCD consumers upon entering an establishment of a merchant. The checking-in of the PCD consumer may include verifying credentials for gaining access to a central mobile payment controller and receiving a merchant identifier corresponding to a merchant from a computer communication's network. Next, a scan of a machine-readable code associated with at least one of a good and a service may be received. Information associated with the machine-readable code may be retrieved from a database. Subsequently, a personalized price for the at least one good or service may be determined by applying one or more rules. The personalized price may be transmitted over a computer communications network to the portable computing device for display to the PCD consumer.

30 Claims, 26 Drawing Sheets

(51) Int. Cl.
*G06Q 30/02* (2012.01)
*G06Q 20/32* (2012.01)
*G06Q 20/20* (2012.01)
*G06Q 30/00* (2012.01)

(56) References Cited

U.S. PATENT DOCUMENTS

| | | | |
|---|---|---|---|
| 6,179,206 B1 | 1/2001 | Matsumori | |
| 9,027,827 B2 * | 5/2015 | Dessert | G06Q 20/322 235/375 |
| 2002/0062249 A1 * | 5/2002 | Iannacci | 705/14 |
| 2005/0040230 A1 | 2/2005 | Swartz et al. | |
| 2010/0145784 A1 | 6/2010 | Sriver et al. | |
| 2010/0262554 A1 | 10/2010 | Elliott | |
| 2011/0029364 A1 | 2/2011 | Roeding et al. | |
| 2011/0191181 A1 | 8/2011 | Blackhurst et al. | |
| 2011/0246306 A1 | 10/2011 | Blackhurst et al. | |
| 2011/0295670 A1 | 12/2011 | Thomas et al. | |
| 2012/0005076 A1 | 1/2012 | Dessert et al. | |
| 2013/0181045 A1 | 7/2013 | Dessert et al. | |

OTHER PUBLICATIONS

Supplementary European Search Report—EP12812477—Search Authority—The Hague—Mar. 23, 2015.

* cited by examiner

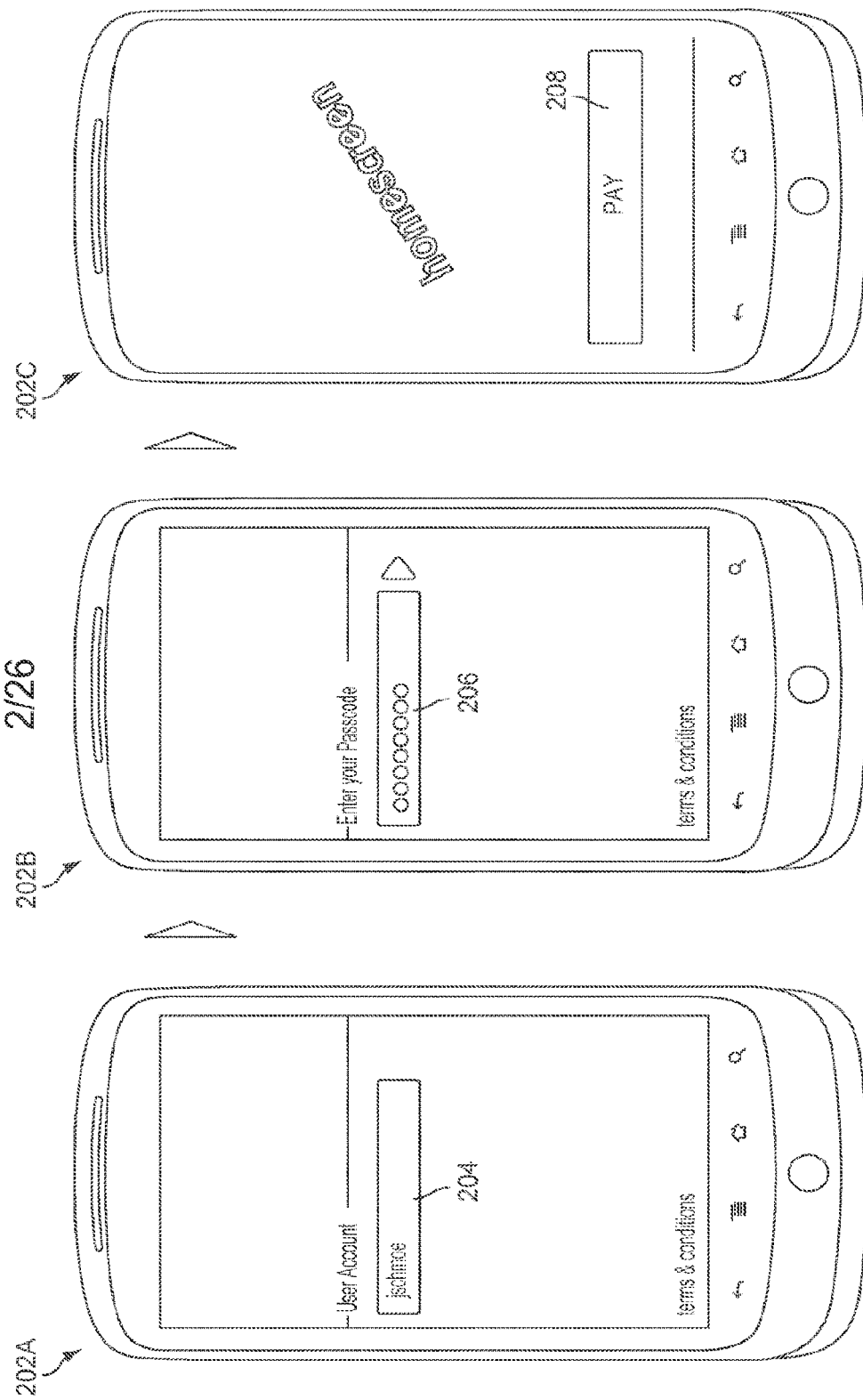

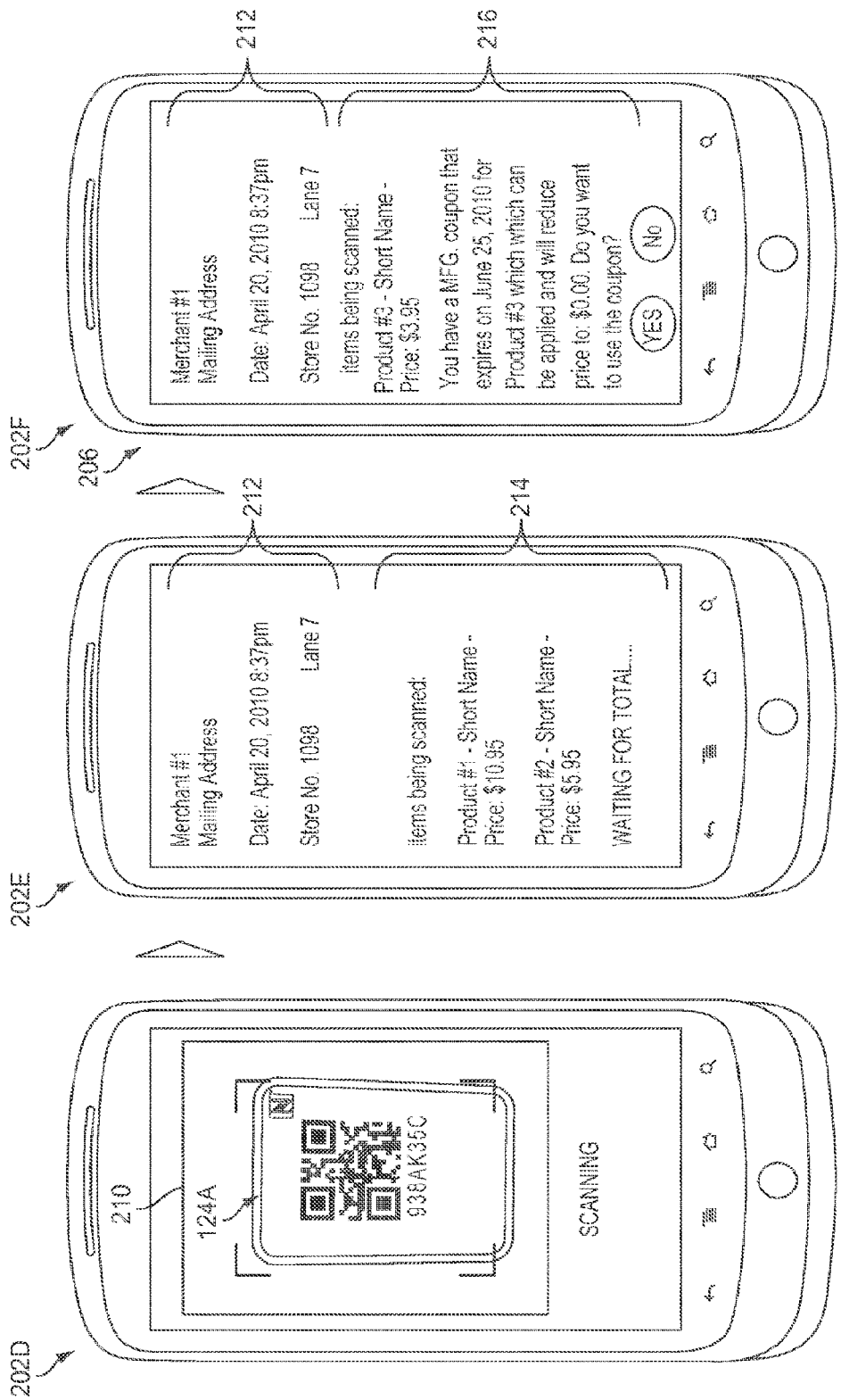

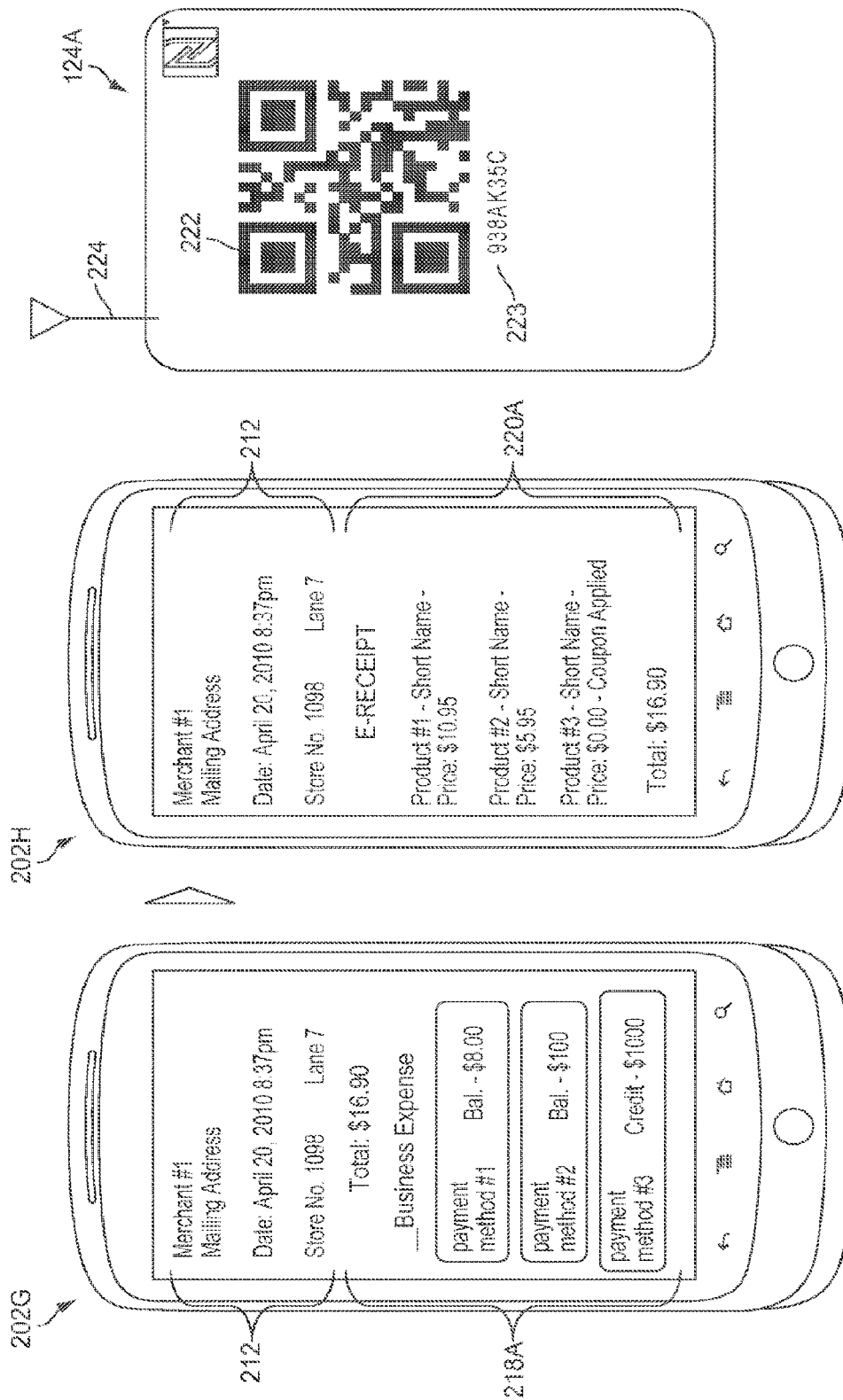

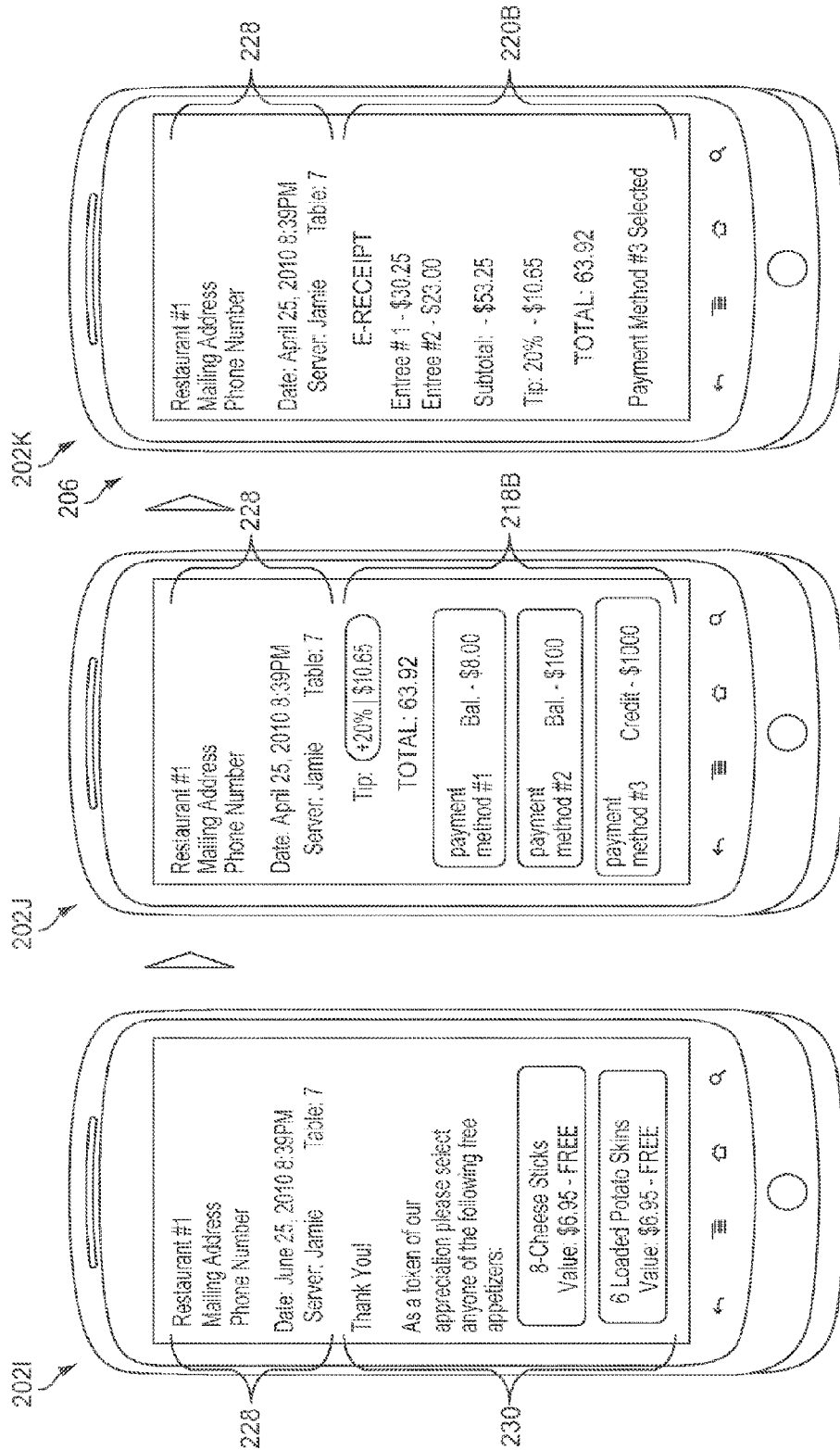

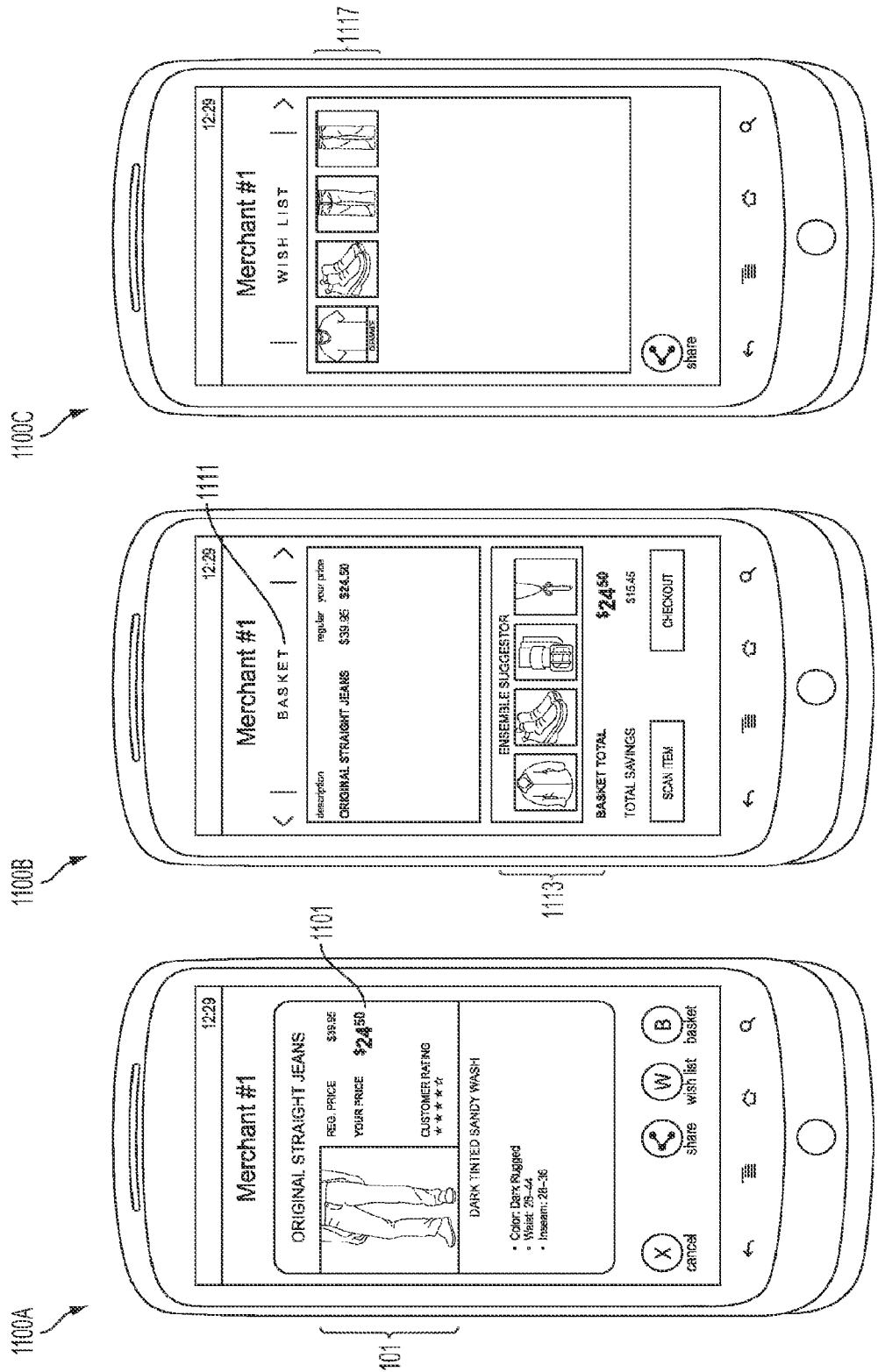

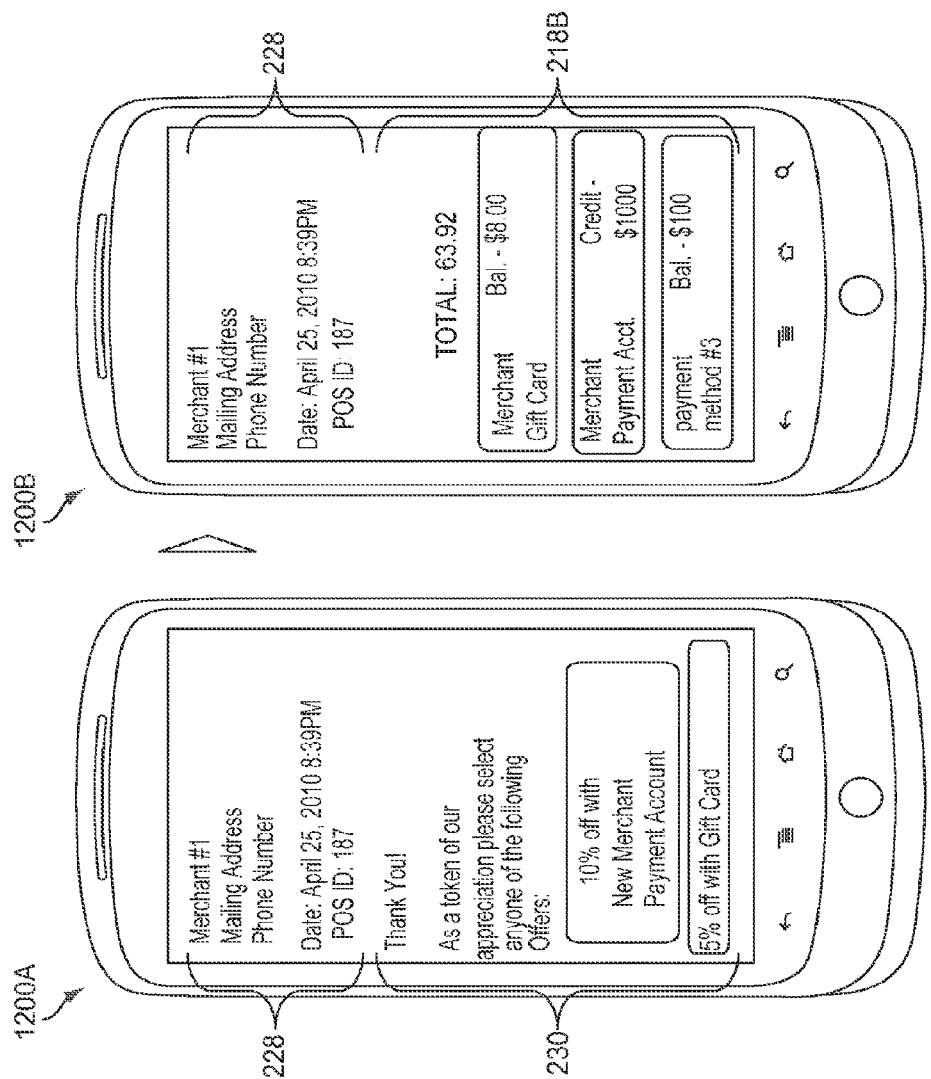

SYSTEM AND METHOD FOR PROVIDING A PERSONALIZED SHOPPING EXPERIENCE AND PERSONALIZED PRICING OF PRODUCTS AND SERVICES WITH A PORTABLE COMPUTING DEVICE

PRIORITY CLAIM AND RELATED APPLICATIONS STATEMENT

This application is a continuation of and claims priority under 35 U.S.C. §120 to U.S. Non-Provisional patent application Ser. No. 13/365,424, entitled, "SYSTEM AND METHOD FOR PROVIDING A PERSONALIZED SHOPPING EXPERIENCE AND PERSONALIZED PRICING OF PRODUCTS AND SERVICES WITH A PORTABLE COMPUTING DEVICE," filed on Feb. 3, 2012, and which claims priority under 35 U.S.C. §119(e) to U.S. Provisional Patent Application Ser. No. 61/586,900, entitled, "SYSTEM AND METHOD FOR PROVIDING A PERSONALIZED SHOPPING EXPERIENCE AND PERSONALIZED PRICING OF PRODUCTS AND SERVICES WITH A PORTABLE COMPUTING DEVICE," filed Jan. 16, 2012. The entire contents of which are hereby incorporated by reference.

DESCRIPTION OF THE RELATED ART

Absent any use of portable computing devices ("PCDs") by consumers, like mobile phones, merchants in traditional shopping environments typically do not have the opportunity to strongly influence decisions of the consumer with respect to the products and/or services that a consumer desires to purchase. However, when consumers use PCDs to assist with their shopping experience (transforming these consumers into "PCD consumers"), merchants may now have the opportunity strongly influence the buying decision of such PCD consumers. Conventional PCD shopping applications exist and are offered by several merchants. But such conventional PCD shopping applications fall short in providing offers that are unique and personalized to each individual PCD consumer.

Accordingly, what is needed is a system and method that may overcome the generic product/service offering problems associated with conventional shopping applications for PCDs which are available to a consumer for purchasing goods or services (or both).

SUMMARY OF THE DISCLOSURE

According to one exemplary aspect of the system and method, a personalized shopping experience with a portable computing device may be provided by checking-in PCD consumers upon entering an establishment of a merchant. The checking-in of the PCD consumer may include verifying credentials for gaining access to a central mobile payment controller and receiving a merchant identifier corresponding to a merchant from a computer communication network. Next, a scan of a machine-readable code associated with at least one of a good and a service may be received. Information associated with the machine-readable code may be retrieved from a database. Subsequently, a personalized price for the at least one good or service may be determined by applying one or more rules. The personalized price may be transmitted over a computer communications network to the portable computing device for display to the PCD consumer.

Determining a personalized price for the consumer may include determining a level of interest in the good or service selected by the consumer. Exemplary ways to determine a level of interest in the good or service include, but are not limited to, determining if a machine-readable code associated with the good or service has been scanned by the portable computing device; determining if the product or service is contained within at least one of a wishlist, a virtual shopping cart, and a virtual check out list; and determining if the product or service has been purchased previously by the consumer.

The method and system may further include executing one or more rates for generating a suggestion of an additional product or service associated with the scanned machine-readable code. At least one of a stock keeping unit database, a customer profile database, a demographics database, and a promotion database may be accessed in order to generate the suggestion.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 2A is a diagram of a screen for entering a user's log-in credentials on the PCD to access the system;

FIG. 2B is diagram of a screen for entering additional log-in credentials such as a password on the PCD to access the system;

FIG. 2C is a diagram of a screen for the PCD confirming access to system;

FIG. 2D is a diagram of a screen that shows the contents of an image being scanned with a camera of the PCD;

FIG. 2E is a diagram of a screen that shows merchant information relevant to a transaction and a line item listing of products being scanned by a product scanner coupled to an electronic cash register;

FIG. 2F is a diagram of a screen that shows merchant information relevant to a transaction and a coupon option that may be selected by a user;

FIG. 2G is a diagram of a screen that shows merchant information relevant to a transaction and a total bill for a purchase along with a plurality of payment options that may be selected by a user;

FIG. 2H is a diagram of a screen that shows an electronic receipt that may be provided upon completion of a transaction with a merchant;

FIG. 2I is a diagram of an exemplary machine-readable tag that may be coupled to an electronic cash register of a merchant;

FIG. 10B is a diagram of a screen that shows relevant merchant information and an option for an offer from a merchant that may be selected by a user prior to the end of a transaction;

FIG. 10C is a diagram that shows merchant information relevant to a transaction and a total bill for a purchase along with a plurality of payment options that may be selected by user;

FIG. 10D is a diagram of a screen that shows electronic receipt that may be provided upon completion of a transaction with a merchant, such as a restaurant;

FIG. 11A is a diagram of a screen that illustrates a good or product that has been scanned by a PCD 100 and its corresponding personalized price;

FIG. 11B is a diagram of a screen that illustrates a virtual shopping cart or basket along with a suggested ensemble of related products by the ensemble engine;

FIG. 11C is a diagram of a screen that illustrates a virtual wish list that may be updated by the PCD consumer with his or her PCD;

FIG. 12A is a diagram of a screen that shows merchant information relevant to a transaction and a total bill for a purchase along with a plurality of offers which were generated by a tender steering algorithm; and FIG. 12B is a diagram of a screen that shows merchant information relevant to a transaction and a total bill for a purchase along with a plurality of payment options that may be selected by user and which were re-ordered by a tender steering algorithm.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
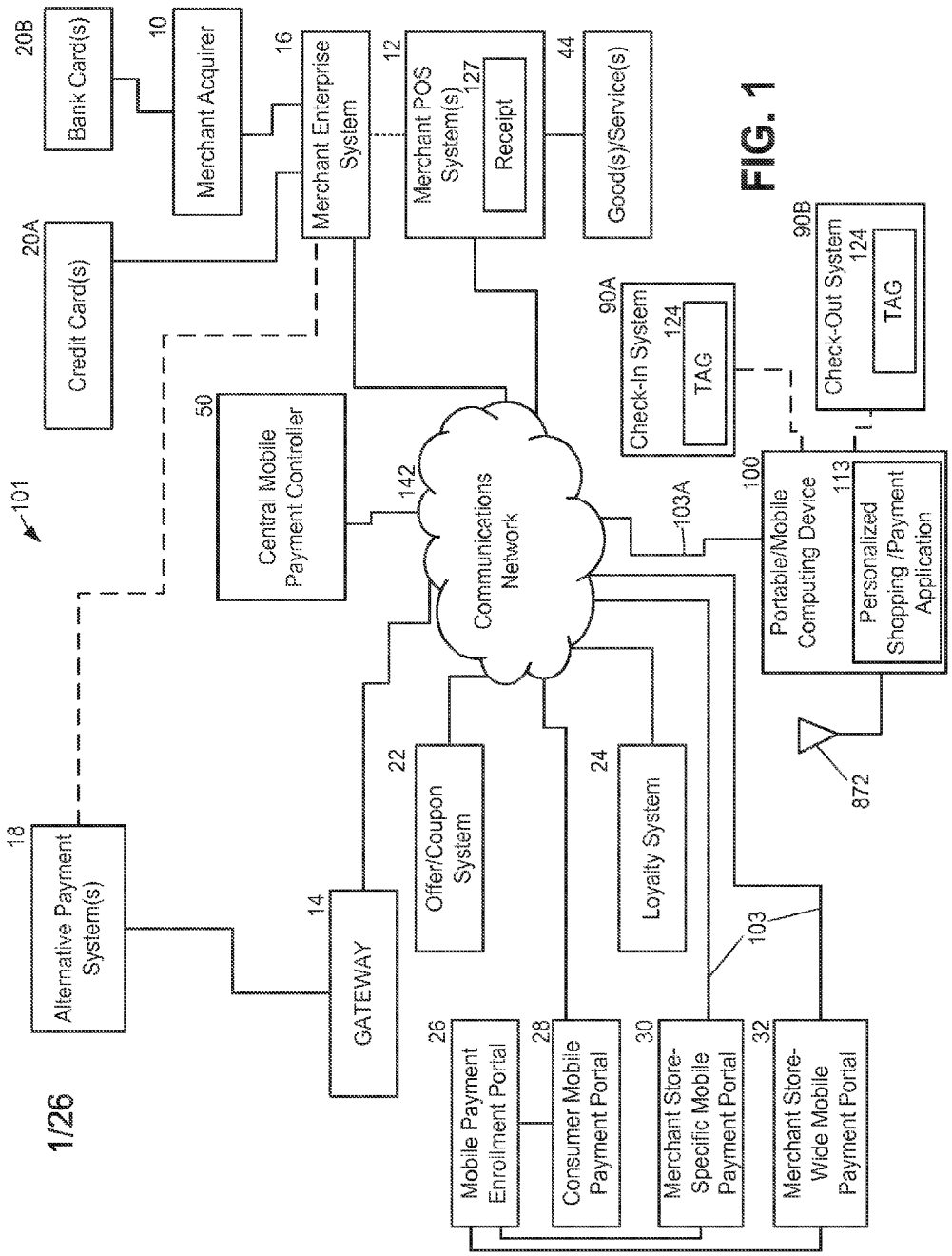
FIG. 1 is a diagram of a wireless portable computing device ("PCD") coupled to a wireless communications network which are integral parts of a system for managing transactions with the portable computing device.

Referring initially to FIG. 1, this Figure is a diagram of a wireless portable computing device ("PCD") 100 coupled to a communications network 142 via a wireless communication link 103A which are integral parts of a system 101 (also referred to herein as a transaction management system 101) for managing transactions with the portable computing device 100.

Many of the system elements illustrated in FIG. 1 are coupled via communication links 103 to the communications network 142. The communication links 103 illustrated in FIG. 1 may comprise wired or wireless links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof.

The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The PCD 100 is shown to have a RF antenna 872 (see FIG. 8) so that a respective PCD 100 may establish a wireless communication link 103A with the communications network 142 via RF transceiver towers (not illustrated). The portable computing device (PCD) 100 may support a personalized shopping/payment application 113 that may reside in memory 803 (See FIG. 8) of the PCD 100.

The personalized shopping/payment application 113 may allow the PCD 100 to communicate with the central mobile payment controller 50 over the communications network 142. The personalized shopping/payment application 113 may also allow the PCD 100 to collect information from a machine-readable tag 124 (also referred to herein as tag 124) that may be coupled to an electronic cash register ("ECR") 412 (not illustrated in FIG. 1, but see FIG. 4) of a check-out system 90B or at some location within the premise of a merchant that comprises a check-in system 90A. Further details about the check-in system 90A and the check-out system 90B will be described below in connection with FIG. 3A.

The machine-readable tag 124 may comprise a unique merchant identifier and a unique terminal (or electronic cash register) identifier that helps the PCD 100 to manage point-of-sale (POS) transactions. Further details about the machine-readable tag 124 will be described below in connection with FIG. 2I. The ECR 412 (not illustrated in FIG. 1, but see FIG. 4) of the Merchant POS system 12 may comprise a mechanical or electronic device or combination thereof for calculating and recording sales transactions. The ECR 412 of the merchant POS system 12 may produce a physical receipt 127 at the end of a transaction that lists goods and/or services purchased with the portable computing device 100. Further details about the merchant POS system 12 will be described below in connection with FIG. 4.

The merchant POS system 12 may be coupled to the merchant enterprise system 16 via the communications network 142. The merchant enterprise system 16 may support the completion of transactions when credit cards or when bank cards have been selected as a form of payment for a particular transaction. Further details about the merchant enterprise system 16 will be described below in connection with FIG. 4. The merchant enterprise system 16 may be coupled to a merchant acquirer 10 and one or more credit card systems 20A. The merchant acquirer 10 may be coupled to one or more bank card systems 20B supported by financial institutions like banks. Further details about the merchant acquirer 10, the credit card systems 20A, and bank card systems 20B will be described below in connection with FIG. 5.

The merchant enterprise system 16 may also be coupled to alternative payment systems 18. Alternative payment systems 18 may include, but are not limited to, such systems like PAYPAL™, Google payments, etc. that currently exist as of this writing. The alternative payment systems 18 may be coupled to a gateway 14. Further details about the alternative payment systems 18 and gateway 14 will be described below in connection with FIG. 6.

A central mobile payment controller 50 is coupled to the portable computing device 100 via the communications network 142. The central mobile payment controller 50 is responsible for connecting or linking the portable computing device 100 to the merchant POS system 12 and merchant enterprise system 16. The central mobile payment controller 50 is also responsible for coupling the offer/coupon system 22 and loyalty system 24 to the portable computing device 100. The central mobile payment controller 50 is also responsible for managing several online portals 26-32. Further details about the central mobile payment controller 12 will be described below in connection with FIG. 7A. Meanwhile, further details about be online portals 26-32 will be described below in connection with FIG. 7B.

An operator (also referred to as a PCD consumer) of the PCD 100 may physically enter an establishment of a merchant, such as a store. The operator "checks-in" with the merchant's enterprise system 16 using his or her PCD 100. An operator may check-in with the enterprise system 16 using a check-in system 90A in combination with the PCD 100. The check-in system 90A may comprise a machine-readable tag 124 that is presented at an entrance to a merchant's store or in various locations within a particular store.

In other exemplary embodiments, the tag 124 may be coupled to individual products within a merchant's premises. In other cases, the tag 124 may be provided on any object in order to initiate a transaction using the portable computing device 100. The tag 124 may be provided on billboards, in printed magazines, etc. In other scenarios, the tag 124 may be displayed on a television screen as part of a TV shopping network. The tag 124 may be provided on Internet Websites adjacent to products/services 44 to facilitate an on-line transaction using the portable computing device 100.

The machine-readable tag 124 may compose a machine-readable code 222 which may be scanned with a camera 848 (See FIG. 8) of the PCD 100. A personalized shopping/payment application 113 running on the PCD 100 may be able to process the scanned machine-readable code 222.

The machine-readable code 222 may comprise either a one dimensional or two-dimensional barcode. Further, other machine-readable codes are included within the scope of the invention and may include contactless technologies, such as near-field communications (NFC), WiFi, acoustic, which may or may not be linked to a secure-element, and RFID cards as understood by one of ordinary skill in the art. For these contactless technologies, the tag 124 may comprise an antenna 224 coupled to an integrated-circuit chip (not illustrated).

Once "checked-in", the personalized shopping/payment application 113 running on the PCD 100 may provide a unique or personalized list of products/services 44, such as "daily specials/" for the PCD consumer available for purchase that is generated by the merchant enterprise system 16 working in conjunction with the central mobile payment controller 50. The central mobile payment controller 50 has a rules engine 737, a personalized pricing module 742, and a product ensemble engine 781 that are illustrated and described in further detail below in connection with FIG. 7A. The rules engine 737, personalized pricing module 742, and product ensemble engine 781 are responsible for providing product/service data to the personalized shopping/payment application 113.

In addition to providing a personalized list of products/services 44, the personalized shopping/payment application 113 may allow the PCD consumer to scan-in bar codes associated with products/services 44 that the PCD consumer may desire to purchase which are located within the establishment of the merchant. After a PCD consumer scans-in a product and/or service, the personalized shopping/payment application 113 working in conjunction with the central mobile payment controller 50 may provide personalized prices for the product and/or service which are significantly less than the ticketed price of the product or service. Further, the personalized shopping/payment application 113 may suggest an ensemble of products or services that may or may not be related to the scanned-in product or service which may be of interest to the PCD consumer.

The personalized shopping/payment application 113 running on the PCD 100 may support a wishlist of products and/or services that a PCD consumer is interested in but may not purchase until a future time. The personalized shopping/payment application 113 may also support a virtual shopping cart or virtual shopping basket that may contain products and/or services that the PCD consumer desires to purchase before leaving the establishment of the merchant. The personalized shopping/payment application 113 may track a running total cost for the goods/products that the PCD consumer intends to purchase.

Figure 4:
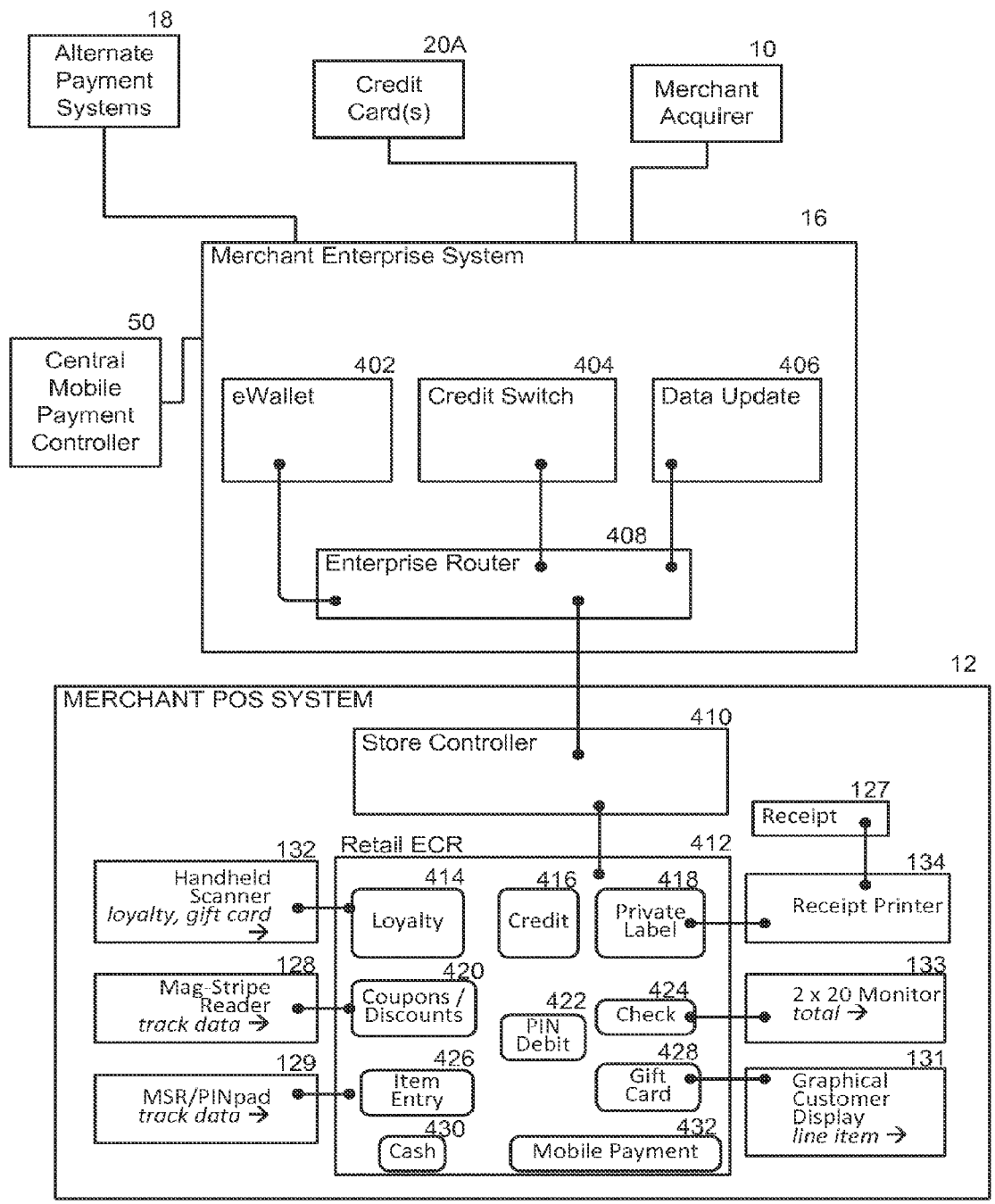
FIG. 4 is a diagram illustrating details for the merchant point-of-sale system and the merchant enterprise system of FIG. 1 for completing a sales transaction.

When the PCD consumer is ready to purchase the products and/or services in the virtual shopping cart or shopping basket, the PCD consumer may proceed to check-out where the products and/or services may be scanned with a product scanner 132 (See FIG. 4). Prior to or in parallel to the operation of scanning products with the product scanner 132, the operator of the PCD 100 may retrieve the unique terminal identifier and the merchant identifier associated with a tag 124 of a check-out system 90B which is affixed to the ECR 412 of the Merchant POS system 12. The operator of the PCD 100 may retrieve the data from the tag 124 by scanning the tag 124 with the camera 848 or with a near-field-communication ("NFC") antenna 879.

This unique terminal (or ECR) identifier and merchant identifier retrieved by the PCD 100 may be relayed back to the central mobile payment controller 50 along with a personal identification number ("PIN"). In response to receiving the terminal identifier, merchant identifier, and PIN, the central mobile payment controller 50 may send messages to merchant enterprise system 16. The central mobile payment controller 50 may request the merchant enterprise system 16 for the product scan data being generated by the product scanner 132 of the merchant POS system 12.

In response to this request from the central mobile payment controller 50, merchant enterprise system 16 may forward the product scan data to the central mobile payment controller 50. The central mobile payment controller 50, in turn, may relay the product scan data to the PCD 100 so that the product scan data may be displayed on the display device of the PCD 100. The PCD 100 may provide an option that may be selected by an operator to turn off this product scan data from being displayed on the display device of the PCD 100 while the products 130A are being scanned. This product scan data may be displayed adjacent to the personalized pricing that was previously calculated and displayed while the PCD consumer was shopping.

Meanwhile, when the product scanner 132 of the merchant POS system 12 is finished scanning the products/services 44 for purchase, the ECR 412 may generate a final total of money due for payment in connection with the purchase of the products/services 44. This final total data is communicated from the merchant POS system 12 to the merchant enterprise system 16. The merchant enterprise system 16 then relays the final total to the central mobile payment controller 50 which in turn relays this information to the PCD 100. In addition to relaying this final total data to the PCD 100, the central mobile payment controller 50 may also retrieve payment accounts available to the operator and that may have been selected by an operator in a predetermined order for display on the PCD 100. Alternatively, the system 101 via the tender steering module 744 of the central mobile payment controller 50 may list the payment accounts in a predetermined order or sequence as will be described below in connection with FIGS. 7A, 9E, and FIGS. 12A-12B.

At this time, or any time during the transaction cycle, an operator of the PCD 100 may select from one of a plurality of payment methods supported by the central mobile payment controller 50 and which are displayed on the PCD 100. Alternatively, an operator of the PCD 100 may select a plurality of payment methods in order to pay the final total due in connection with the purchased products/services 44. Once a payment method or a combination of methods are selected by an operator of the PCD 100, the PCD 100 relays this selection to the central mobile payment controller 50.

Depending upon the form of payment selected, the central mobile payment controller 50 selects data from a gateway 14 for rendering payment associated with the final total data. If an alternative form of payment is selected by the operator of the PCD 100, then the central mobile payment controller 50 will relay the alternative payment account information through the gateway 14 to the alternative payment systems 18.

If a traditional form of payment is selected by the operator of the PCD 100, such as the selection of a credit card account, then the central mobile payment controller 50 may relay this credit card payment information over a secure channel to the merchant enterprise system 16. The merchant enterprise system 10 may relay the credit card payment information to the merchant acquirer 10 for bank card systems 20B or to credit card networks for credit card systems 20A.

Exemplary credit card networks, may include, but are not limited to, the VISA™ credit card network, the MASTER-CARD™ card network, the DISCOVER™ credit card network, the AMERICAN EXPRESS™ credit card network, and other similar charge card proprietary networks. One of ordinary skill in the art recognizes that transactions for merchant gift cards may also follow the same flow with the merchant enterprise system 16 directing the transaction to the merchant's stored value processor that may be part of the credit card systems 20A or alternative payment systems 18.

If payment is approved by one of the traditional payment systems 20, then the merchant enterprise system 16 may relay this approval message to the merchant POS system 12. The merchant POS system 12 relays the approval message to the electronic cash register 126 and to the central mobile payment controller 50. If payment is approved by one of the alternative payment systems 18, the central mobile payment controller 50 may relay this information to the PCD 100 and the merchant enterprise system 10.

The central mobile payment controller 50 may send any payment approval messages to the PCD 100 for display on the display device of the PCD 100. The central mobile payment controller 50 may generate an electronic receipt that can be forwarded and displayed on a display device of the PCD 100. Meanwhile, the ECR 412 may also generate a hard copy receipt 127.

FIG. 2A is a diagram of a screen 202A of the PCD 100 for entering a user's log-in credentials, such as a user name 204 on the PCD 100 to access the system 101. The user's log-in credentials 204 may comprise a unique user name selected by an operator of the PCD 100. When the user name is entered by the operator of the PCD 100, the central mobile payment controller 50 may verify that the user name entered and a unique identifier assigned to the PCD 100 match by checking client profiles which may be stored in the eWallet module 732F (See FIG. 7A). One of ordinary skill in the art recognizes that authentication of the operator of the PCD 100 at this stage may include other security measures beyond just a user name/password. Other security measures which may be used as alternatives or as supplemental security measures to those already described include, but are not limited to, biometrics, secure elements such as integrated-circuit (IC) cards or smart cards, and other like methods in the art of multi-factor authentication.

If the user name and unique identifier assigned to the PCD 100 do not match, then the central mobile payment controller 50 may deny entry to the system 101 and prompt the user for correct credentials for a predetermined number of times. If the user name and unique identifier assigned to the PCD 100 do match, then the central mobile payment controller 50 may prompt the operator of the PCD 100 for a password 206 associated with the user name on the account such as illustrated in FIG. 2B.

FIG. 2B is a diagram of a screen 202B for entering additional log-in credentials such as a password 206 on the PCD 100 to access the system 101. If the correct password 206 is not entered by an operator of the PCD 100 after a predetermined number of times, the central mobile payment controller 50 may lock out the account associated with the user name that was entered in the screen 202A of FIG. 2A. If the correct password 206 is entered by an operator of the PCD 100, then the central mobile payment controller 50 may generate a welcome screen 202C such as illustrated in FIG. 2C.

FIG. 2C is a diagram of a screen 202C for the PCD 100 confirming access to system 101. The welcome screen 202C may also comprise an execution button 208 that may activate the transaction software 501 residing on and supported by the PCD 100. Upon selecting the execution button 208, the PCD 100 may launch the personalized shopping/payment application 113 running on the PCD 100 which causes the PCD 100 to generate the next screen 202D as illustrated in FIG. 2D.

FIG. 2D is a diagram of a screen 202D that shows the contents of an image 210 being scanned with a camera 848 of the PCD 100. The image 210 being scanned by the camera 848 (See FIG. 8 for camera) may comprise one of the tags 124 of FIG. 1. As noted previously, the tag 124 of FIG. 1 may comprise machine-readable data such as a two-dimensional barcode that contains a unique identifier associated with a particular electronic cash register 126 and a particular merchant. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, Mini-Code, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

Instead of a two dimensional bar code, a one dimensional bar code may be employed to provide the unique electronic cash register identifier and the unique identifier associated with the merchant. Exemplary one-dimensional bar codes may include, but are not limited to, U.P.C., Codabar, Code 25—Non-interleaved 2 of 5, Code 23—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, Post-Bar, RM4SCC/KIX, JAN, and Telepen. Other machine readable codes for retrieving the unique identifiers associated with the electronic cash register 126 and merchant are well within the scope of the invention, such as contact-less or wireless communication methods such as near-field communications (NFCs) used with smart cards and RF-ID cards as understood by one of ordinary skill in the art. Further, in another exemplary embodiment, the operator of the PCD 100 may key-in a human-readable code 223 associated with the unique identifier of the electronic cash register 126 and the merchant.

FIG. 2E is a diagram of a screen 202E that shows merchant information 212 relevant to a transaction and a line item listing 214 of products during check-out being scanned by a product scanner 132 coupled to an ECR 412 (See FIG. 4). The merchant information 212 may comprise information such as, but not limited to, a merchant name, a mailing address of the store, date and time data relevant to the transaction, a store number, and a electronic cash register number, and other like information. The line item listing 214 of product scan data may comprise information such as, but not limited to, a product number, a short name for the product, a price and other similar information. According to an exemplary embodiment, an operator of the PCD 100 may shut "off" the line item listing 214 as a user defined preference which may be stored in the second storage device 146B.

While the product scanner 132 (of FIG. 4) is scanning the machine-readable product codes from the products/services 44, the central mobile payment controller 50 sway match these machine-readable product codes with coupon data retrieved from the offer/coupon system 22, which was made while the PCD consumer was shopping previously. The offer/coupon system 22 may include one or more client profiles associated with the PCD 100.

FIG. 2F is a diagram of a screen 202F that shows merchant information relevant to a transaction and a coupon option 216 that may be selected by an operator of the PCD 100. Screen 202F may be generated in response to the central mobile payment controller 50 determining a match between a coupon retrieved from the offer/coupon system 22 and products/services 44 being scanned. Screen 202F may list merchant information 212 and the coupon option 216 which prompts the operator of the PCD 100 to decide whether or not to use a coupon that matches a product 130 which was scanned by the product scanner 132A. This coupon option 216 may be turned off by an operator of the PCD 100 so that this screen 202F is not generated when a match is found by the central mobile payment controller 50.

An operator of the PCD 100 may allow automatic matching of coupons as they are discovered by the central mobile payment controller 50. In the exemplary screen 202F, the operator of the PCD 100 is asked to decide whether or not to use a manufacturer's coupon that may reduce the price of purchase for a products/services 44 to zero. If the operator of the PCD 100 decides not to use the coupon, then the coupon data may remain in storage accessible by the central mobile payment controller 50 until another match is found by the central mobile payment controller 50.

FIG. 2G is a diagram of a screen 202G that shows merchant information 212 relevant to a transaction and a total bill for a purchase along with a plurality of payment options 218A that may be selected by the operator. In the example illustrated in FIG. 2G, the total amount due for the purchase is $16.90. The payment options 218A allow a user to select the expense as a business expense towards taxes. The payment options 218A also allow an operator of the PCD 100 to select among a plurality of payment methods that may have been previously selected by the operator and stored in a user's profile in the second storage device 146B.

In other words, prior to conducting any transactions, an operator of the PCD 100 may arrange a predetermined listing of the sequence of payment methods which should be displayed to an operator of the PCD 100 whenever the operator employs the PCD 100 for a transaction. The operator of the PCD 100 may also create an association with the predetermined order of payment methods for particular merchants. This means that an operator of a PCD 100 may have a first sequence of payment methods for a first merchant and a second different sequence of payment methods for a second merchant that are stored in a client profile of the central mobile payment controller 50.

The central mobile payment controller 50 via a tender steering module 744 (See FIG. 7A) may also display payment options 218A. These payment options 218A may provide the operator of the PCD 100 with additional benefits such as credit cards affiliated with a current merchant which may award more loyalty points if the affiliated credit card is used for a purchase.

In other exemplary embodiments, the central mobile payment controller 50 via the tender steering module 744 as described below in connection with FIG. 7A may allow the merchant to control the payment options 218A that are presented to the operator of the PCD 100. In this way, the merchant may be provided with a form of payment steering—an indirect control of how an operator of a PCD 100 may decide on how to pay for a products/services 44 through the intelligence provided by the tender steering module 744.

The operator of the PCD 100 may also select one or more different payment methods to pay the total final amount due for a particular purchase which are displayed on the PCD 100. So, for example, a operator may select a credit card to pay a portion of the final bill along with payment from a stored value card and payment from a debit card. According to one exemplary aspect of the invention, the current balances of stored value accounts as well as remaining credit on credit card accounts may be displayed in conjunction with the payment options 218A that are available for selection by the operator with the PCD 100 as illustrated in FIG. 2G.

According to another exemplary feature of the system 101, credit card issuers as well as debit card issuers and stored value account issuers do not need to send any physical tokens to an operator of the PCD 100 when new account numbers may be assigned to a particular operator of the PCD 100. Instead of mailing physical tokens bearing the new account numbers, the issuers of the new account numbers may update the data a storage device or a secure vault. A corresponding message may be transmitted from the central mobile payment controller 50 to the operator of the PCD 100 when new account numbers have been stored in the secure vault or a storage device in place of old account numbers.

FIG. 2H is a diagram of a screen 202H that shows an electronic receipt 220A that may be provided upon completion of a transaction with a merchant. The electronic receipt 220A may comprise a product listing as well as the total price paid for the products/services 44 which were purchased. The payment method(s) selected by the operator (though not illustrated) may also be displayed on the electronic receipt 220A.

FIG. 2I is a diagram of an exemplary machine-readable tag 124 that may be coupled to an electronic cash register 126 of a merchant that is part of a check-out system 90B. Alternatively or in addition to the check-out system 90B, the machine-readable tag 124 may be provided in a check-in system 90A as described above. The machine readable tag 124 may also be attached or affixed to a product and/or it may be associated with the cost of a service.

The machine-readable tag 124 may comprise a machine-readable code 222 which may be scanned with a camera 848 of the PCD 100. The personalized shopping/payment application 113 running on the PCD 100 may be able to process the scanned machine-readable code 222.

As noted above, the machine-readable code 222 may comprise either a one dimensional or two-dimensional barcode. Further, other machine-readable codes are included within the scope of the invention and may include contactless technologies, such as near-field communications (NFC) which may or may not be linked to a secure-element, and RFID cards as understood by one of ordinary skill in the art. For these contactless technologies, the tag 124 may comprise an antenna 224 coupled to an integrated-circuit chip (not illustrated).

As described above, for check-in scenarios or systems 90A, the tag 124 may provide a unique identifier associated with the physical location of the establishment of a merchant such as a store. For check-out scenarios for systems 90B, the tag 124 may provide a unique identifier associated with the electronic cash register 126 and a unique identifier associated with a merchant that operates the electronic cash register 126. These unique identifiers may be contained within the machine-readable code and/or associated with the code. The tag 124 may also comprise a human-readable code 223 that may be keyed-in by the operator of the PCD 100 instead of scanning the machine-readable code 222 with the PCD 100.

Figure 3A:
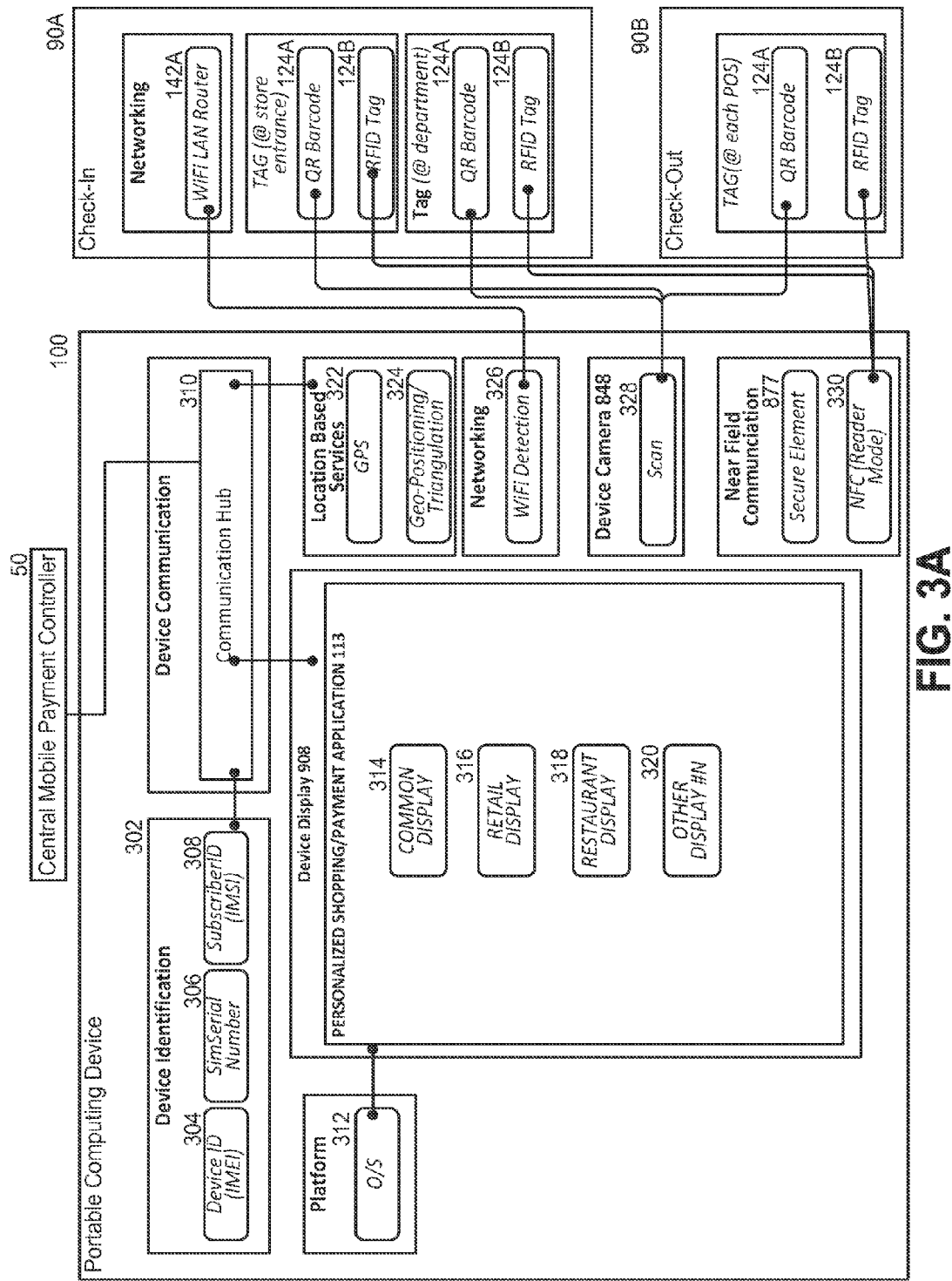
FIG. 3A is a diagram of hardware components and software components running on a portable computing device for supporting transactions with the portable computing device.

FIG. 3A is a diagram of hardware components and software components running on a portable computing device 100 for supporting transactions with the portable computing device 100. The components may include a device identification module 302, a communication hub module 310, an operating system platform ("O/S") module 312, a global positioning satellite ("GPS") module 322, a geo-positioning/triangulation module 324, a WiFi detector module 326, a scan module 328, a secure element module 877, and a near field communication module 330.

One of the software components may include the personalized shopping/payment application 113. The personalized shopping/payment application 113 may further comprise additional modules for rendering visuals on the device display 908. These additional modules may include, but are not limited to, a common display module 314, a retail display module 316, a restaurant display module 318, and other display modules #N 320. Further details about the additional modules that are part of the personalized shopping/payment application 113 will be described below in connection with FIG. 3B.

The device identification module 302 may also comprise submodules such as a device identifier or International Mobile Equipment Identity ("IMEI") module 304, a subscriber identity module ("SIM") serial number module 306, and/or a subscriber identifier module or international mobile subscriber identity ("IMSI") module 308. Usually, a portable computing device 100 would usually have only one of these modules to uniquely identify the portable competing device 100 to the communications network 142 and the central mobile payment controller 50 as understood by one of ordinary skill in the art.

The communication hub module 310 is responsible for relaying information between the device identification module 302 and the central mobile payment controller 50 as well as between the GPS module 322 and the central mobile payment controller 50. The communication hub module 310 may support conventional mobile phone communication protocols as understood by one of ordinary skill in the art.

The GPS module 322 and geo-positioning/triangulation module 324 may assist the central mobile payment controller 50 with determining the physical location of the portable computing device 100. Once the central mobile payment controller 50 is aware of the physical location of the portable computing device 100, the central mobile payment controller 50 may determine in which merchant location the portable computing device 100 is located.

The WiFi detector module 326 may communicate with a WiFi local area network router 142A that is part of a check-in system 90A. The check-in system 90A may allow an operator of the portable computing device 100 to alert the central mobile payment controller 50 when the portable computing device has entered into the location of a merchant. In this way, the central mobile payment controller 50 may be able to provide unique offers to the operator of the portable computing device 100 before the operator decides to complete a transaction for a products/services 44.

The check-in system 90A may further comprise machine-readable tags 124 that include, but are not limited to, a QR barcode tag 124A, and a radiofrequeney-identifier ("RF-ID") tag 124B. These machine-readable tags 124 of the check-in system 90A may be positioned at the entrance of a store and they may be positioned in multiple locations within a store such as in a department store. In a department store example, a machine-readable tag 124 may be positioned within specific different departments such as in hardware and in athletic goods so that the central mobile payment controller 50 may generate unique offers tailored to the department within which the portable computing device 100 is located.

The check-out system 90B may also comprise machine-readable tags 124 that are positioned at each point-of-sale terminal or electronic cash register ("ECR") 126. Each machine-readable tag 124 of the check-out system 90B, like the check-in system 90A, may comprise a 2-D QR barcode 124A and/or an RFID tag 124B.

The scan module 328 may work in conjunction with the camera 848 of the portable computing device 100. The scan module 328 may process scans of the 2-D QR barcodes that are present on respective machine-readable tags 124. Similarly, the secure element module 877 and NFC module 330 may work with RFID tag 124B that may be part of either the check-in system 90A or the check-out system 90B. The O/S module 312 may comprise any one of conventional mobile phone operating systems known as of this writing. For example, the O/S module 312 may comprise an android operating/system, an iPhone operating system, a Java 2 Platform Micro Edition ("J2ME") operating system, a Research-In-Motion ("RIM") operating system, and a Binary Runtime Environment for Wireless ("BREW") MP operating system as understood by one of ordinary skill in the art.

FIG. 3E is a diagram of several software components for a personalized shopping/payment application 113 running on a portable computing device 100. The software components may form the common display module 314, the retail display module 316, and the restaurant display module 318 of FIG. 3A. The software components for the common display module 314 may include, but are not limited to: a splash module 314A, a home semen module 314B, a sign-in module 314C, a password module 314D, a scanning module 314E, a manual scan module 314F, a personal identification number ("PIN") module 314G, a locations module 314H, an NFC tap module 314I, a search module 314J, a show map module 314K, a store receipts module 314L, a search receipt module 314M, a "my account" module 314N, a preferences module 314O a devices module 314P, a sign-account module 314Q, and a disable account module 314R, as understood by one of ordinal skill in the art.

In this example, the splash module 314A performs the user and device authentication check on the display 808, such as a touch screen display, of the PCD 100. The home screen module 314B allows the operator to return to a home screen or default screen for the PCD 100. The sign-in module 314C allows manages any credentials that the operator enters into the PCD 100. The password module 314D reviews any received credentials for a match with the password selected by the operator. The scanning module 314E activates an automatic scanning feature supported by the PCD 100 so that the camera may automatically focus the camera for 848 for reading a tag 124. The manual scan module 314F activates a manual scanning feature in which the operator may control the focus of the camera 848 for reading a tag 124.

The personal identification number ("PIN") module 314G allows the operator to change his or her PIN as understood by one of ordinary skill in the art. The locations module 314H supports a function in which the PCD 100 may display the closest merchants who support the PCD payment features. The NFC tap module 314I allows an operator to activate NFC functionality of the PCD 100. The search/ module 314J allows an operator to search for specific transactions that were made using the PCD 100. The show map module 314K may support functions such as a geographical map relative to the location of the PCD 100 as well as maps of building plans for merchants who support payments with the PCD 100.

The store receipts module 314L allows an operator to pull up copies of electronics receipts for any transaction completed by the PCD 100. The search receipt module 314M allows the operator to search for specific electronic receipts that were generated by the PCD 100. The "my account" module 314N allows an operator to review the current balances and pending payments supported by the PCD 100 for transactions completed with the PCD 100. The preferences module 314O allows an operator to display preferences for the account associated with the PCD 100, such as allowing the operator to select a preferred sequence of payment accounts to use with the PCD 100 for a transaction.

Figure 3B:
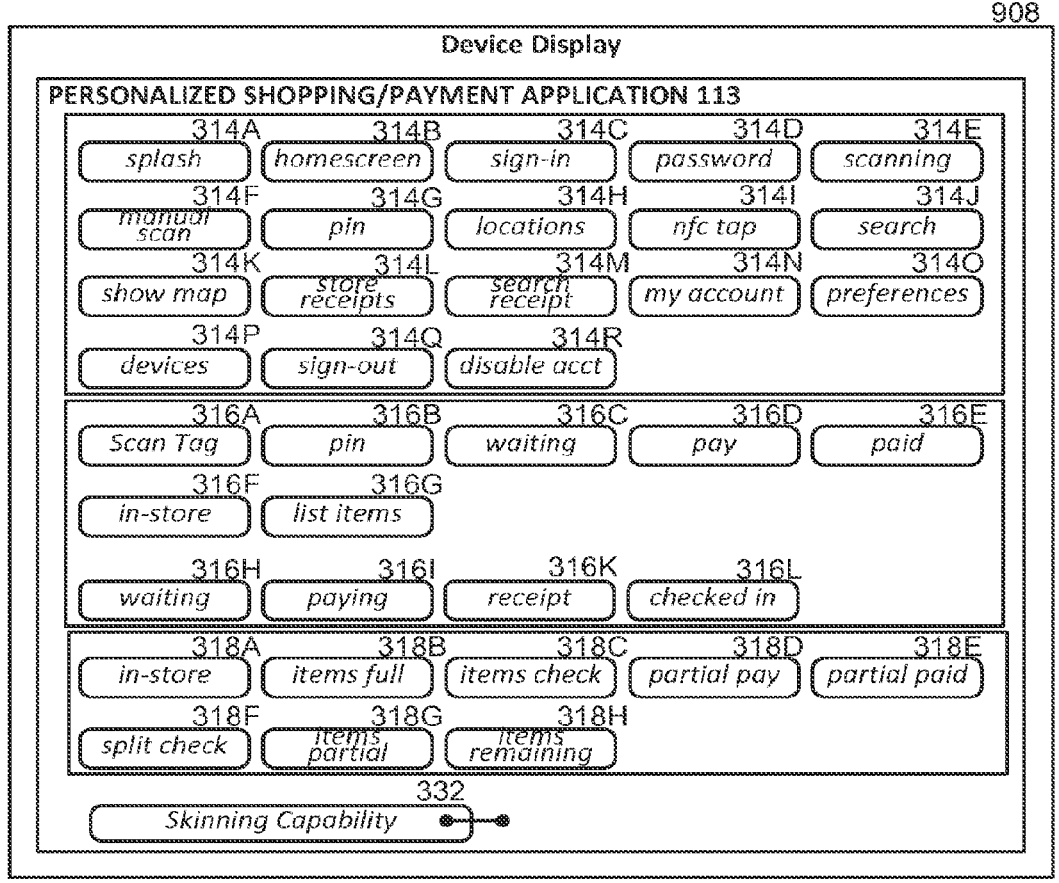
FIG. 3B is a diagram of several software components for a personalized shopping/payment application running on a portable computing device.

In some embodiments, the preferences module 314O of FIG. 3B may allow the operator of the portable computing device 100 to preconfigure the sequence or order of payment accounts that are displayed by the portable computing device 100. This preconfiguration impacts when the operator is ready to make a payment using the portable computing device 100. This preconfiguration of sequence or order of payment accounts may be a setting that cannot be overridden by the merchant via the tender steering module 744. In other words, this preconfiguration setting or option supported by the preferences module 314O of the PCD 100 may deactivate or disable some or all of the functions of the tender steering module 744 which is described below in connection with FIGS. 7A, 9E, and 12A-12B.

This preconfiguration may also allow the operator of the PCD 100 to make a purchase with a one touch or single touch action instead of multiple actions to scroll through available payment account options. However, if an operator does not set up this preconfiguration, a default setting of the portable computing device 100 may allow the sequence or order of payment accounts to be controlled by the merchant as described below in connection with the tender steering module, which is a focus of FIG. 7A and FIGS. 9E, and 12A-12B.

The devices module 314P allows an operator to review the multiple PCDs 100 that may be used by the operator to complete transactions. For example, if the operator had a plurality of mobile phones, then the devices module 314P may display a listing of the mobile phones associated with use of the mobile payment account. The sign-account module 314Q may allow operator to enter his or her electronic signature for completing transactions such as ACH transactions which may require an electronic signature. The disable account module 314R may support a function in which an operator may turn off his or her mobile payment account so that unauthorized use may not occur with other PCDs 100 that may be associated with the account.

The software components for the retail display module 310 may include, but are not limited to: a scan tag module 316A, a PIN module 316B, a first waiting module 316C, pay module 316D, a paid module 316E, and in-store module 316F, a list items module 316G, a second waiting module 316H, a paying module 316I, a paid module 316J, a receipt module 316K, and a check-in module 316L as understood by one of ordinary skill in the art.

The scan tag module 316A may automatically activate the camera 848 for focusing on a tag 124. The PIN module 316B may allow operator to change his or her PIN that may be associated only with retail transactions. The first waiting module 316C may activate a timer that an operator may select when he or she is waiting for the ECR 412 to communicate with the central mobile payment controller 50. The pay module 316D may allow the operator to automatically pay a balance when the balance is displayed by the PCD 100. The paid module 316E notifies the operator of the authorization or decline of each form of payment previously selected as well as the overall success or decline of the full transaction.

The in-store module 316F may allow the operator to indicate that he or she is present within the store of a merchant prior to checking-in or checking-out using a tag 124. The list items module 316G may allow operator to redisplay any items being checked out for a payment transaction associated with the PCD 100. A second waiting module 316H may be activated by an operator of the PCD 100 when he or she is waiting for their payment options after a total bill for the transaction has been displayed. The paying module 316I, which works with the tender steering module 744 of FIG. 7A, may display the amount due along with a selection of applicable tender/payment methods previously loaded to the central mobile payment controller 50.

The operator of the PCD is given the opportunity to select one or more methods of payment to satisfy the amount due. The receipt module 316K allows an operator display the electronic receipt associated with the last transaction or the current transaction being processed by the PCD 100. The check-in module 316L may be activated by the operator when she or he is about to use the check-in system 90A of FIG. 1A.

The software components for the restaurant display module 318 may include, but are not limited to: an in-store module 318A, an items full module 318B, an items check module 318C, a partial pay module 318D, a partial paid module 318E, a split check module 318F, an items partial module 318G, and an items remaining module 318H as understood by one of ordinary skill in art.

The in-store module 318A may allow operator to alert the central module payment controller 50 that the PCD 100 is present within a restaurant. The items full module 318B displays the full list of items scanned in or otherwise entered by the "sales associate". The items check module 318C allows an operator of the PCD 100 start a payment process associated with a restaurant transaction so that the operator does not need to wait for a waiter or waitress.

The partial pay module 318D allows the operator of the PCD 100 to pay with the PCD 100 in addition to another form of payment not supported by the PCD 100 such as by a physical token like a credit card carried by the operator of the PCD 100. In the case where multiple parties each identify themselves as payors of the full amount due, the partial paid module 318E notifies the each operator of the approval or decline of their portion of the entire amount due.

The split check module 318F allows an operator to split a check with another person who may be dining with the operator of the PCD 100. The items partial module 318G displays only the items that have been identified by the operator of the PCD as his/her portion of the full bill. The items remaining module 318H displays all items and remaining amount due that has not yet been satisfied during a split check.

The skinning capability module 332 provides a function for enabling a third party to utilize the full functionality of the system but with the look-n-feel of their choosing.

FIG. 4 is a diagram illustrating details for the merchant point-of-sale ("POS") system 12 and the merchant enterprise system 16 of FIG. 1 for completing a sales transaction with a portable computing device 100. The merchant POS system 12 may comprise a store controller 410 and an electronic cash register ("ECR") 412. The ECR 412 may comprise a drawer for storing cash currency. The ECR 412 may also print a receipt 127 for a customer with a printing device, like a printer (not illustrated).

The ECR 412 may be coupled to a handheld (or fixed) scanner 132 which may be used to scan other machine-readable labels attached to one or more products/services 44. The scanner 132 may comprise a bar code reader or any type of similar device used to collect information from machine-readable labels attached to products/services 44.

The ECR 412 may also be coupled to a reader (or terminal) 128, such as a magstripe reader or other such device for reading any one of a number of tokens 123 such as credit cards, debit cards, loyalty cards, stored value cards such as gift cards, and the like.

For example, the reader 128 may comprise a device that reads magnetic stripes on cards, integrated circuit cards, and near-field-communication (NFC) cards as understood by one of ordinary skill in the art. The reader 128 may be coupled with a keypad 129 so that a consumer may enter appropriate information relative to any token that may be scanned or read by the reader 128.

The ECR 412 is also coupled to the store controller 410. The store controller 410 may support one or more electronic cash registers (ECRs) 126 for a particular location of a merchant. The store controller 410, as understood by one of ordinary skill in the art, may comprise a computer server for tracking and matching scanned product codes with a product inventory database (not illustrated separately) which is maintained by the store controller 410.

The store controller 410 may receive product data that is produced by the product scanner 132 and which is relayed by the ECR 412. The store controller 410 may be responsible for securing authorization for payment from a consumer after a token is read by the POS terminal 128B. The store controller 410 may support one or more product specific languages as understood by one of ordinary skill in the art such as, but not limited to, unified POS and JAVA™ POS.

To secure authorization for payment, such as for a credit or debit card, the store controller 410 communicates the merchant enterprise system 16 via the communications network 142. The merchant enterprise system 16 may comprise an Ewallet system 402, a credit switch 404, a data update module 406, and an enterprise router 408.

As illustrated in FIG. 4, the store controller 410 communicates with the enterprise router 408 of the merchant enterprise system 16. The router 408 may comprise a device that interconnect two or more computer networks, and selectively interchanges packets of data between them, as is understood by one of ordinary skill in the art.

The router 408 of FIG. 4 couples the store controller 410 to credit card system 20A and merchant acquirer 10 for traditional payment processing. The router 408 of FIG. 4 also couples the store controller 410 to alternative payment systems 18. Traditional payment processing may include, but is not limited to, processing payments from accounts associated with traditional credit cards and debit cards. The credit card system 20A may comprise exemplary networks such as the VISA™ credit card network, the MASTERCARD™ card network, the DISCOVER™ credit card network, the AMERICAN EXPRESS™ credit card network, and other similar charge or debit card proprietary networks.

Meanwhile, the alternative payment systems 18 may be responsible for handling and managing non-traditional or alternative payment processing. For example, alternative payment processing may include, but is not limited to, processing payments from accounts associated with certain online financial institutions or other service providers, like PAYPAL™, BILL ME LATER™, Wii™, APPLE™, GREEN DOT™, and mobile phone carriers like SPRINT™ and VERIZON™.

The eWallet system 402 may provide information and support functions for one or more stored value accounts as well as other types of accounts, such as, but not limited to, credit card accounts and bank accounts, as understood by one of ordinary skill in the art. The data update module 400 may allow the merchant enterprise system 162 update its records for any new mobile payment accounts that were used by consumers to pay for transactions.

The electronic cash register ("ECR") 412 may comprise a plurality of components. These components may include hardware and software modules. Exemplary components include, but are not limited to, a loyalty module 414, a credit module 416, a private-label module 418, a coupons/discounts module 420, a PIN/debit module 422, a check module 424, an item entry module 426, a gift card module 428, a cash module 430, and a mobile payment module 432. The aforementioned components may be selected by an operator of the ECR 412 in order to complete payment for a transaction.

The ECR 412 may be coupled to a product scanner 132 for scanning one-dimensional and two-dimensional barcode labels. The ECR for 12 may also be coupled to a reader 128 that may comprise a magstripe and/or an NFC reader. The ECR 412 may also be coupled to a PIN pad 129 as well as a receipt printer 134 for printing a receipt 127, a sale total monitor 133, and a graphical customer display 131 that may list one items purchased during a transaction.

Figure 5:
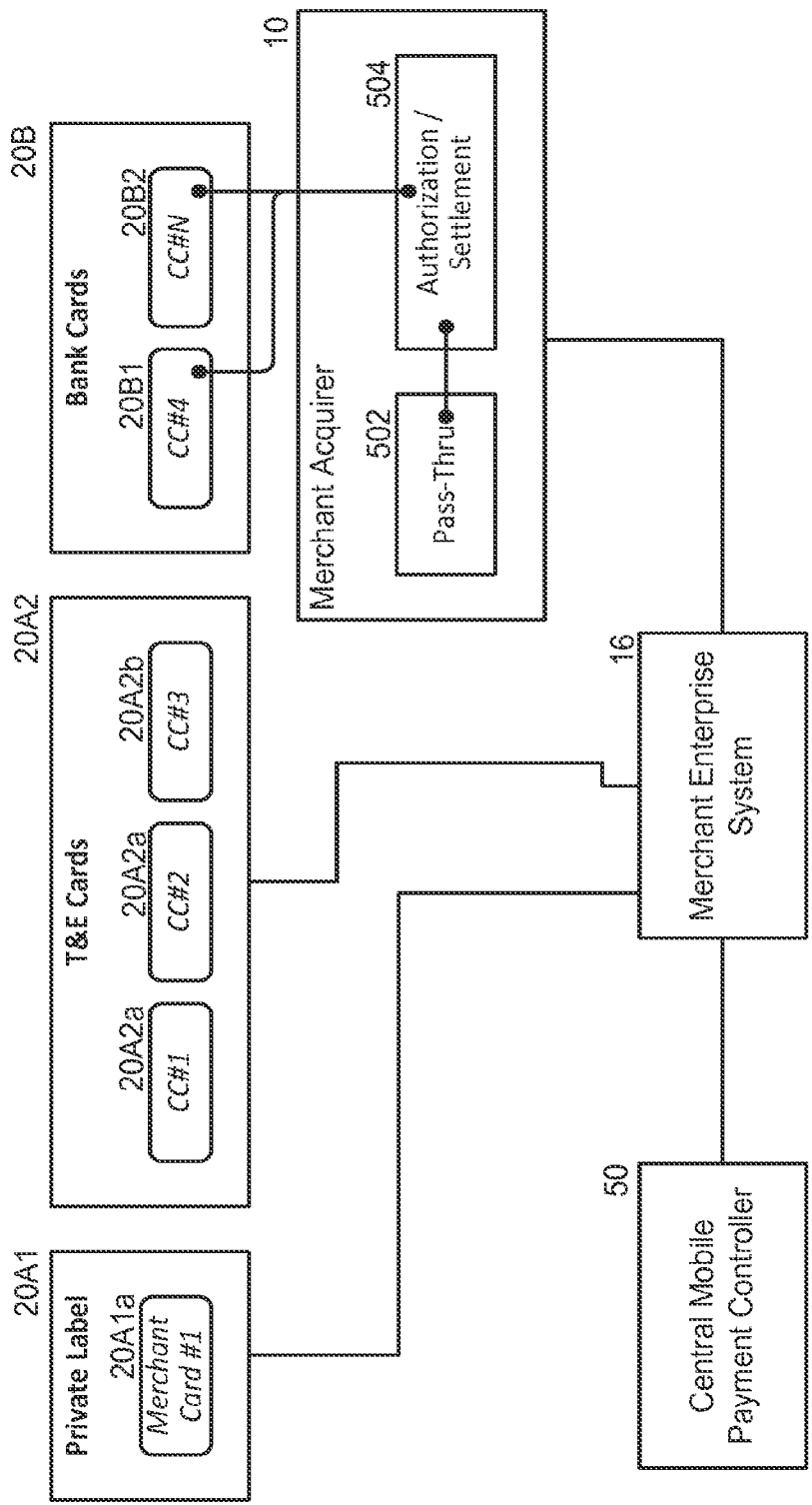
FIG. 5 is a diagram illustrating details of a merchant acquirer and credit card subsystems of FIG. 1 for completing a sales transaction.

FIG. 5 is a diagram illustrating details of a merchant acquirer 10, bank card systems 20B, and credit card systems 20A of FIG. 1 for completing a sales transaction. The merchant acquirer 10 may comprise a pass-through module 502 and an authorization/settlement module 504. The pass-through module 502 may pass request for payment authorization information directly to a selected bank card system 20B. Meanwhile, the authorization/settlement module 504 may perform some authentication prior to sending request for payment authorization onto a bank card system 20B.

The merchant acquirer 10 usually supports credit card systems that are provided by financial institutions such as banks. For example, credit card 20B1 may comprise a first bank card like a CHASE™ card from CHASE™ bank while credit card 20B2 may comprise a second bank card like a NATIONS BANK™ card from the NATIONS BANK™ lender. These institutions usually offer their brand of VISA™ and MASTERCARD™ type cards.

Other credit card systems 20A may comprise private-label cards 20A1 as well as traditional travel and entertainment cards 20A2. Private-label cards may include, but are not limited to, merchant based cards 20A1*a* such as those for specific retail establishments like, THE HOME DEPOT™, WALMART™, NORDSTROM™, SAX™, etc. Traditional travel and entertainment cards 20A2 may include, but are not limited to, DINERS CLUB CARD™, AMERICAN EXPRESS™, and DISCOVER™.

While a direct connection is illustrated between the merchant enterprise system 16 and the credit card systems 20A as well as the merchant acquirer 10, one of ordinary skill in the art recognizes that such a connection may be a virtual one which is supported by the communications network 142. Similarly, a direct connection is illustrated between the merchant enterprise system 16 and the central mobile payment controller 50. This direct connection may also comprise a virtual one supported by the communications network 142 as illustrated in FIG. 1.

Figure 6:
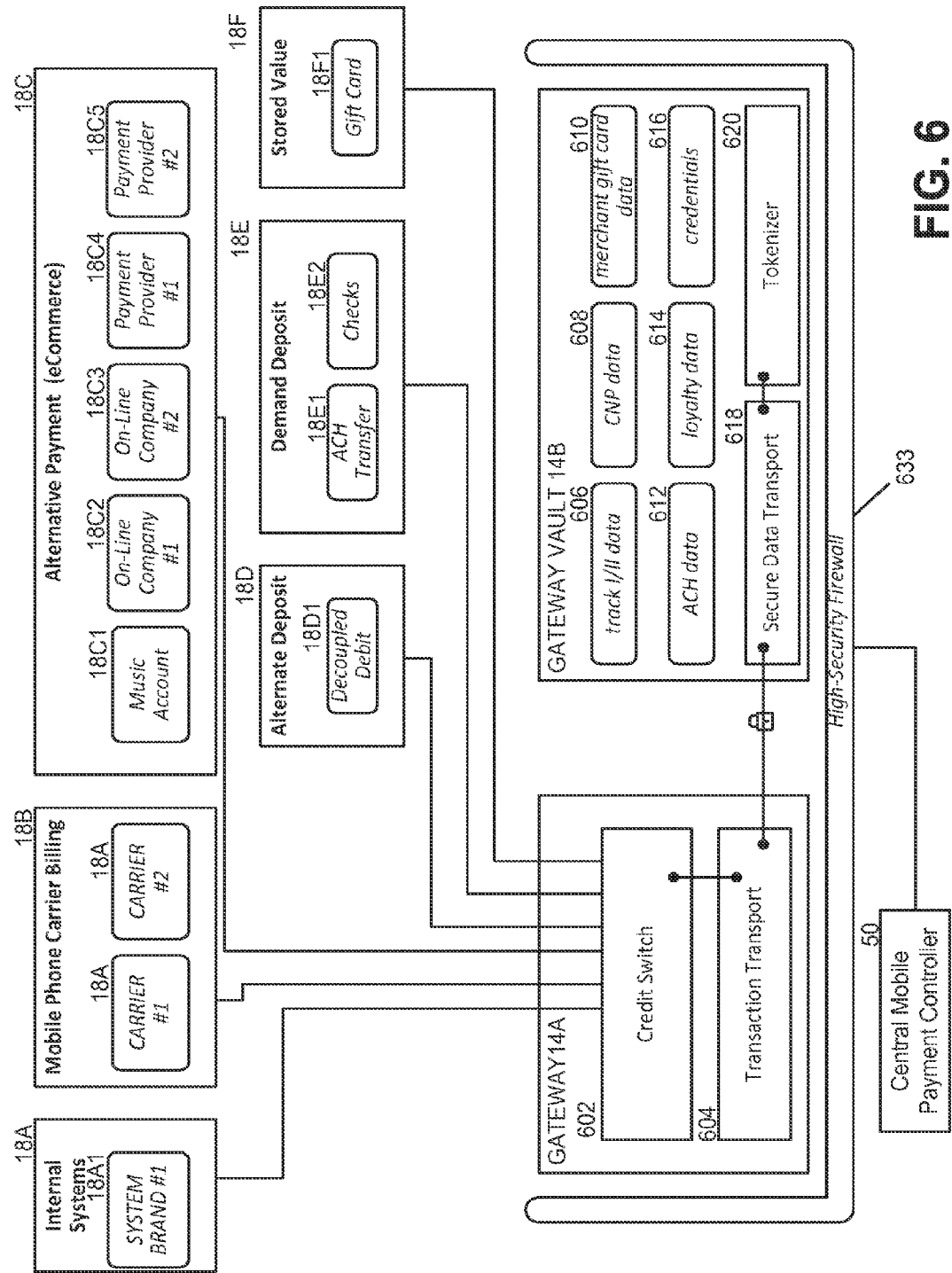
FIG. 6 is a diagram illustrating details of a gateway and alternative payment systems illustrated in FIG. 1.

FIG. 6 is a diagram illustrating details of a gateway 14 and alternative payment systems 18 illustrated in FIG. 1. The gateway 14 may comprise a traditional gateway module 14A, a gateway vault 14B, and a high-security firewall 633. The high-security firewall 633 provides a secure communication channel between the central mobile payment controller 50 in the gateway 14. A traditional gateway module 14A may comprise a credit switch 602 and a transaction transport module 604.

The traditional gateway module 14A may comprise a payment server as understood by one of ordinary skill in the art. Communications between the central mobile payment controller 50 and the gateway 14 may comprise a secured socket layer (SSL) encrypted connection and may pass through the high-security firewall 633 as understood by one of ordinary skill in the art. Usually, the central mobile payment controller 50 issue commands to the gateway vault 14B to relay account information to the gateway module 14A. The payment gateway module 14A may forward the transaction information to one of the alternative payment systems 18 via the credit switch 602.

Specifically, the credit switch 602 may be responsible for exchanging data with each of the different alternative payment systems 18 illustrated in FIG. 6. The transaction transport module 604 may be responsible for exchanging data with a secure data transport module 618 of the gateway vault 14B.

The gateway vault 14B may comprise track 1/track two data 606, card not present ("CNP") data 608, merchant gift card, data 610, automated clearinghouse ("ACH") data 612, loyalty data 614, and credentials 616. The gateway vault 14B may also comprise a tokenizer 620. The tokenizer 620 may receive a payment authorization request from the central mobile payment controller 50 in format according to specific industry rules based on the payment accounts stored with or associated with the gateway vault 14B.

The alternative payment systems 18 may comprise various different methods of payment available to the operator of the portable computing device 100 for completing a transaction. The alternative payment systems 18 may comprise internal systems 18A, mobile phone carrier billing 18B, e-commerce vendors 18C, alternate deposit systems 18D, demand deposit schemes 18E, and stored value systems 18F.

For example, an internal system 18A may comprise accounts from an Ewallet system for the portable computing device 100, such as SWAGG™ brand of mobile payments offered by Outlier (a subsidiary of QUALCOMM, Incorporated). Mobile phone carrier billing systems 18B may include, but are not limited to, accounts from wireless carriers as of this writing such as, SPRINT™ accounts, AT&T™ accounts, VERIZON™ accounts, etc. e-commerce vendors 18C may include, but are not limited to, accounts from e-commerce vendors like iTUNES™ accounts, GOOGLE™ check out accounts, AMAZON™ payments, BILLMELATER™ accounts, and PAYPAL™ accounts. Alternate deposit systems 18D may include be coupled debit systems 18D1 and the like. Demand deposit systems 18E may include ACH transfers 18E1 and checks 18E2. And stored value systems 18F may include gift cards 18F1 offered by a merchant.

Figure 7A:
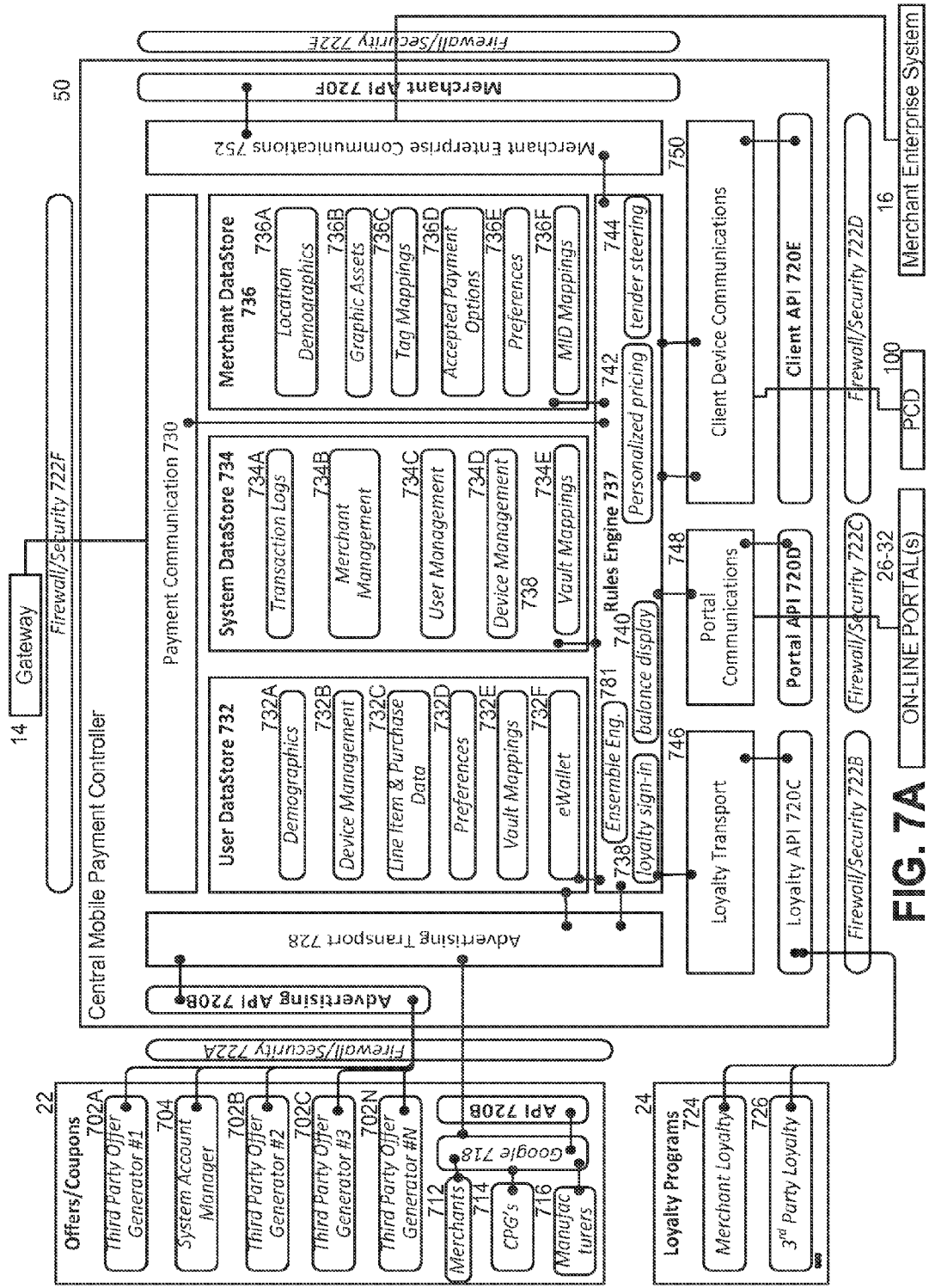
FIG. 7A is diagram illustrating details for the central mobile payment controller illustrated in FIG. 1 that assists with providing personalized pricing and ensemble suggestions for the PCD consumer.

FIG. 7A is diagram illustrating details for the central mobile payment controller 50 illustrated in FIG. 1. The central mobile payment controller 50 manages data between the PCD 100 and the merchant enterprise system 16. The central mobile payment controller may support industry standard compliance measures. For example, the central mobile payment controller may be compliant with Payment Card Industry ("PCI") standards. In this way, the merchant enterprise system 16 and the PCD 100 do not store any sensitive data such as credit card information and personal information like social security numbers, home addresses, etc. Such sensitive data may be stored in the central mobile payment controller 50.

The central mobile payment controller 50 is also responsible for communicating with a gateway 14 for establishing a connection with alternative payment systems 18. The central mobile payment controller 50 may also relay product scan data sent from the merchant enterprise system 10 over the communications network 142 to the PCD 100. In this way, the PCD 100 may display products individually (merchandise/service stock keeping unit—"SKU") on the display of the PCD 100 as they are scanned in by the product scanner 132 of the merchant POS system 12. The central mobile payment controller 50 may also relay identification (loyalty), promotions (offers/discounts), and payment information between the PCD 100 and merchant POS system 12 as described in further detail below.

The central mobile payment controller 50 may comprise a payment communication module 730, a user data store module 732, a system datastore module 734, a merchant data store module 736, a rules engine 737, an advertising API 720B, an advertising transport module 728, a loyalty API 720C, a loyalty transport module 746, a portal API 720D, a portal communications module 748, a client API 720E, a client device communications module 750, a merchant API 720F, and a merchant enterprise communications module 752.

The payment communications module 730 may support the communications between the central mobile payment controller 50 and the gateway 14 that is coupled to the alternative payment systems 18. While a direct connection between the central mobile payment controller 50 and the gateway 14 is illustrated, one of ordinary skill in the art recognizes that this direct connection may be a virtual one using the communications network 142 of FIG. 1. The user data store module 732 may comprise a plurality of submodules that include, but are not limited to, a demographics submodule 732A, a device management module 732B, a line item and purchase data module 732C, a preferences module 732D, a vault mappings module 732E, and an Ewallet module 732F.

The demographics submodule 732A may track preferences of the operator of the PCD 100 as well as characterizations made by the PCD 100 about the possible race, age, and gender of the operator. The device management module 732B may support functions for associating multiple PCDs 100 with the mobile payment accounts of a single operator. The line item and purchase data module 732C may track all purchases made with the portable computing device 100. The preferences module 732D may store and support any new preferences requested by the operator using a PCD 100. The vault mappings module 732E may support request for payments from payment accounts associated with the gateway vault 14B of FIG. 1. An Ewallet module 732F supports request for managing in a walled account associated with a particular PCD 100.

The system datastore module 734 may comprise a plurality of submodules that include, but are not limited to, a transaction log module 734A, a merchant management module 734B, a user management module 734C, a device management module 734D, and a vault mappings module 734E.

The transaction log module 734A may automatically record and store the line items associated with each transaction paid with the portable computing device 100. The merchant management module 734B may automatically record and store the various merchants which received payment from the portable computing device 100.

The user management module 734C may allow the operator of the PCD 100 to manage various functions and options that are selectable for a given mobile count. The device management module 734D may support functions for associating multiple PCDs 100 with the mobile payment accounts of a single operator. The vault mappings module 734E may support request for payments from payment accounts associated with the gateway vault 14B of FIG. 1.

Similarly, the merchant data store module 736 may comprise a plurality of submodules that include, but are not limited to, a location demographics module 736A, a graphic assets module 736B, tag mappings module 736C, and accepted payment options module 736D, a preferences module 736E, and MID mappings module 736F.

The location demographics module 736A may track the various merchant locations that are receiving payments with the PCD 100 for completing transactions. The graphic assets module 736B may support the various graphical elements such as artwork and icons associated with the credit cards. The tag mappings module 736C may store the various specific tags 124 that may be scanned with the PCD 100. The accepted payment options module 736D may control the listing of payment options that are displayed on the PCD 100 when a final amount is listed as due for a transaction. The preferences module 736E may store various preferences from merchants such as payment types and costs associated with each payment type that may be selected by an operator of a PCD 100. The merchant ID ("MID") mappings module 736F associates the system's single "enterprise" relationship to each of the merchant's individual store locations.

The rules engine 737 may also comprise a plurality of modules. Exemplary modules include, but are not limited to, a loyalty sign-in module 738, a balance display module 740, the personalized pricing module 742, a tender steering module 744, and a product ensemble engine 781. The loyalty sign-in module 738 may be responsible for automatically retrieving loyalty data associated with the portable computing device 100. The balance display module 740 may be responsible for sending the data to the display 808 of the portable computing device 100. Such data may include product scan data received from the merchant enterprise system 16 as well as the final total do for products/services 44 that are to be purchased using the portable computing device 100.

The personalized pricing module 742 may be responsible for automatically retrieving offers and coupons from the offer/coupon system 22 based on the current location of the portable computing device as well as any products/services 44 that have been scanned in for purchase by the PCD user and/or the merchant POS system 12. The offer/coupon system 22 includes a third party offer generators 702, a consumer package goods ("CPG") module 714, and a manufacturers module 716 which are described in further detail below. The rules engine 737 working in conjunction with the personalized pricing module 742 may provide the unique and customized or "personalized" pricing for products and/or services displayed by the personalized shopping/payment application 113. While the personalized pricing module 742 has been illustrated in FIG. 7A to be part of the rules engine 737, one of ordinary skill in the art will recognize that the rules engine 737 could be designed to be part of the personalized pricing module 742. Alternatively, the personalized pricing module 742 may be completely separate from the rules engine 737 so that two processing entities exist. The rules engine 737 and personalized pricing module 742 may comprise software or hardware or both. Further details of the rules engine 737 and personalized pricing module 742 are described below and illustrated in FIGS. 7C-7E.

The product/service ensemble engine 781 may suggest additional products and/or services that may be related to products/services 44 that have been scanned-in by the PCD consumer and/or those that are maintained in a wishlist for the PCD consumer. Similar to the personalized pricing module 742, while the product/service ensemble engine 781 has been illustrated in FIG. 7A to be part of the rules engine 737, one of ordinary skill in the art will recognize that the rules engine 737 could be designed to be part of the product/service ensemble engine 781. Alternatively, the product/service ensemble engine may be completely separate from the rules engine 737 to that two processing entities exist.

The tender steering module 744 may be responsible for automatically displaying the options for paying for a particular transaction. The options would include those associated with the alternative payment systems 18 as well as the traditional payment systems 20 that are associated with the operator of the portable computing device 100.

Specifically, with the tender steering module 744 of FIG. 7A working with the paying module 316I of FIG. 3B, a merchant is provided with the ability to arrange payment accounts in a predetermined order or a predetermined sequence so that they are displayed to an operator of a portable computing device 100 so that the merchant may steer or influence the operator of a portable computing device 100 towards one or more payment accounts favored or desired by the merchant.

These payment accounts may be presented in the predetermined order or sequence once the tender steering module 744 receives a signal that indicates the consumer/operator is ready to make a payment on his or her purchase with the portable computing device 100. These payment accounts may include merchant branded or otherwise known as private brand payment accounts which may permit a merchant to collect a rebate on the purchase made by the consumer/operator. Such rebates are usually percentage based and are usually on the order of about 5% of a purchase made by consumer as understood by one of ordinary skill in the art. Other payment accounts may include those accounts in which the merchant may pay a lower interchange rate for processing payments for a transaction. Other accounts that may lower interchange rates for merchants may include stored value accounts like merchant branded gift card accounts.

The tender steering module 744 may promote the use of partial payment with gift cards that do not have value equal to the purchase price. The operator may then select from the portable computing device 100 another form of payment account in addition to the stored value account if the stored value account does not have sufficient value to cover the entire purchase price. In this way, merchants may ensure that low value gift cards are utilized by the consumer so that the merchant may clear out gift card accounts. When merchants clear out gift card accounts, then this may substantially minimize account reporting services required for gift card accounts, especially for low value gift card accounts (such as those under a value on the order of $10 where the cost of the reporting service may approach or exceed the amount of the value maintained in the stored value account).

The system 101 through the tender steering module 744 may order or sequence the payment accounts on a portable computing device 100 in such a fashion so that the most desirable or favored payment accounts by the merchant are presented first to the consumer while the least favored or less desirable payment accounts are pushed or placed at the very end of a list for display on the portable computing device 100. Accounts presented at the end of the list may require additional scrolling effort for the consumer to reach by utilizing a series of sequenced displays as understood by one of ordinary skill in the art.

For example, if the consumer had a merchant branded gift card account, a merchant branded credit card account, and a non-merchant branded credit card-account, then the system may allow the merchant to present the merchant branded gift card account first, the merchant branded credit card account second, and the non-merchant branded credit card account third—assuming that this ranking or listing of payment accounts favors the merchant in which the least expensive is displayed first while the most expensive is displayed last relative to the transaction costs which may be assessed against the merchant. This ranking of payment accounts may also prove beneficial for those non-merchant branded credit card accounts, such as rewards cards, which may have a significantly higher amount of fees that are charged to the merchant and may be used by the consumer.

The system 101 via the tender steering module 744 may also support an intelligence in which payment accounts are presented in a sequence on the PCD 100 that is determined by the actual purchase price for the transaction. For example, the consumer may have a debit card payment account as well as a gift card account. Certain fixed transactional fees may apply to the debit card account while no fees or a percentage of fees may apply to the gift card account. If transaction fees which apply to the debit card account far exceed the percentage of fees corresponding to the gift card, then the system 101 via the tender steering module 744 may select the gift card as the first option to present to the consumer for completing a transaction for the benefit of the merchant.

For example, if a consumer's final purchase price is $1.03 and his debit card charges a fixed fee of $0.50 per transaction to the merchant while the gift card account may only charge 5% of the transaction to the merchant, then the tender steering module 744 may strongly favor or present the gift card as the top choice for the consumer on the portable computing device instead of the higher fee debit card relative to the final purchase price.

In addition to presenting or sequencing the payment accounts for display on a portable computing device 100 in such a fashion so that the most desirable or favored by the merchant are presented first to the consumer while the least favored or less desirable payment accounts are pushed or placed at the very end of a list, the system 101 via the tender steering module 101 will enable merchants to promote or supply additional offers in order to steer or influence consumers towards a payment account desired by a merchant.

For example, the merchant may provide personalized and unique offers to consumers on the PCD 100 after the system 101 via the tender steering module 744 looks-up the consumer's history with the merchant or on other transactions. These personalized and unique offers may be presented adjacent to the payment accounts on the PCD 100 desired by the merchant for the consumer to use to complete a transaction. A merchant may present a reward, like a certain percentage discount, on the PCD 100 in order to persuade a consumer to use a payment account desired by the merchant. These personalized and unique offers may be random in nature or presented in sequences depending on the frequency of use or frequency of transactions completed by the consumer with a merchant.

The merchant may set up certain business rules with the tender steering module 744 in order to control the development of the personalized and unique offers presented to each consumer on his or her PCD 100. For example, the merchant may set up a rule that if a transaction is greater than a predetermined amount of money, then the tender steering module 744 via the pay modules 316D and/or 316I may present a certain desired payment account coupled with a percentage discount on the transaction to the consumer.

As another example, the merchant may set up a rule in the tender steering module 744 that reviews the loyalty program participation of the consumer and what the history of the consumer has been in the program. If the consumer has reached a certain number of visits and/or transaction volume (like money spent and/or or number of items) with the merchant, then the tender steering module 744 may offer a unique and personalized discount that could include a percentage discount on the transaction for the consumer if they use a specific payment account, like a merchant branded payment account. This allows the merchant to influence the payment account selection habits of the consumer since the consumer will likely want to use a payment account that generally may provide occasional discounts beyond other forms of payment accounts.

By looking at the first six digits of payment accounts available to the consumer, the system 101 via the tender steering module 744 may determine a status of the payment account such as its benefits level (i.e. whether the payment account qualifies as a gold level, a platinum level, a diamond level, etc.) and what corresponding interchange rates may apply based on that benefits level. Depending upon what fees will be assessed for the merchant for a particular payment account, the system 101 via the tender steering module 744 may organize or sequence the payment accounts in order from least expensive to most expensive relative to the fees assessed against the merchant for each payment account.

Usually payment accounts with lower status such as regular credit cards without any elite status (like diamond, gold, or platinum levels) will have lower interchange rates because there are fewer benefits provided to the payment account holder. As of this writing, merchants may pay on the order of between about 2.14% to about 5.00% on interchange rates for cards with elite status. Meanwhile, cards without this elite status, especially the merchant branded credit cards or gift cards, will usually be significantly less and, in some instances, the merchant may even receive rebates with their own branded credit card or gift card account.

According to another exemplary aspect, the rules maintained and executed by the tender steering module 744 may determine that the consumer does not have a certain merchant branded payment accounts that would be desirable for the merchant. Since the tender steering module 744 has access to the consumers contact information through a loyalty program, the rules in the tender steering module 744 may allow the merchant to offer the consumer to accept a new payment account starting with the current transaction at hand. If the consumer decides to accept the offer for the new payment account offered by the merchant via the tender steering module 744, then the system 101 via the tender steering module 744 and other modules may run an immediate credit and/or background check to determine if the consumer should be approved for this new payment account. This credit and background check may happen on-the-fly and may be completed within a few minutes upon acceptance by the consumer to take this new merchant branded payment account offered by the merchant through the tender steering module 744.

Referring back again to FIG. 7A, the advertising transport module 728 may support communications between the central mobile payment controller 50 and the offer/coupon system 22. While a direct connection between the central mobile payment controller 50 and the offer/coupon system 22 is illustrated, one of ordinary skill in the art recognizes that this direct connection may be a virtual one using the communications network 142 of FIG. 1. The advertising transport module 728 establishes communications with the offer/coupon system 22 through an advertising API 720B.

The offer/coupon system 22 may comprise a plurality of modules. Exemplary modules include, but are not limited to, third-party offer generators 702A-D as well as a system account manager 704. The offer/coupon system 22 that produces targeted coupons based upon specific products purchased by a consumer. The third-party offer generator 702 may comprise modules supported by Catalina Marketing, Inc., SWAGG™ from Outlier (a subsidiary of Qualcomm, Incorporated), YOWZA!™, Mobilecoupon.com, and GROUPON™ brand of offers/coupons. Other types of offer/coupon system 22 are within the scope of the disclosure is understood by one or a skill in the art.

The offer/coupon system 22 may further comprise a merchant's module 712, a consumer packaged goods ("CPG") module 714, a manufacturers module 716, and a GOOGLE™ module 718.

The loyalty transport module 740 may be responsible for supporting the communications between the central mobile payment controller 50 and the loyalty system 24. While a direct connection between the central mobile payment controller 50 and the loyalty system 24 is illustrated, one of ordinary skill in the art recognizes that this direct connection may be a virtual one using the communications network 142 of FIG. 1. The loyalty transport module 746 exchanges communications through the loyalty API 720C.

The portal communications module 748 may be responsible for supporting communications between the central mobile payment controller 50 and the online portals 26-32. While a direct connection between the central mobile payment controller 50 and the online portals 26-32 is illustrated, one of ordinary skill in the art recognizes that this direct connection may be a virtual one using the communications network 142 of FIG. 1. The online portals 26-32 will be described in further detail below in connection with FIG. 7B.

The client device communications module 750 may support communications between the central mobile payment controller 50 and the portable computing device 100. While a direct connection between the central mobile payment controller 50 and the portable computing device 100 is illustrated, one of ordinary skill in the art recognizes that this direct connection may be a virtual one using the communications network 142 of FIG. 1. The client device communications module 750 may establish communications with the portable computing device 100 through a client API 720E. Specifically, the client device communications module 750 may establish a persistent communication with the portable computing device 100 that may be characterized as a form of secure chat messaging.

The merchant enterprise communications module 752 may support communications between the central mobile payment controller 50 and the merchant enterprise system 16. While a direct connection between the central mobile payment controller 50 and the merchant enterprise system 16 is illustrated, one of ordinary skill in the art recognizes that this direct connection may be a virtual one using the communications network 142 of FIG. 1. The merchant enterprise communications module 752 may establish communications with the merchant enterprise system 16 by using a merchant API 720F. A secure communication channel may be established over the communications network 142 between the merchant enterprise communications module 752 and the merchant enterprise system 16 as understood by one of ordinary skill in the art.

All of the inbound and outbound communications for the central mobile payment controller 50 may pass through firewall/security layers 722A-F as understood by one of ordinary skill in the art. Each firewall/security layer 722 may comprise a device or set of devices designed to permit or deny network transmissions based upon a set of rules.

Figure 7B:
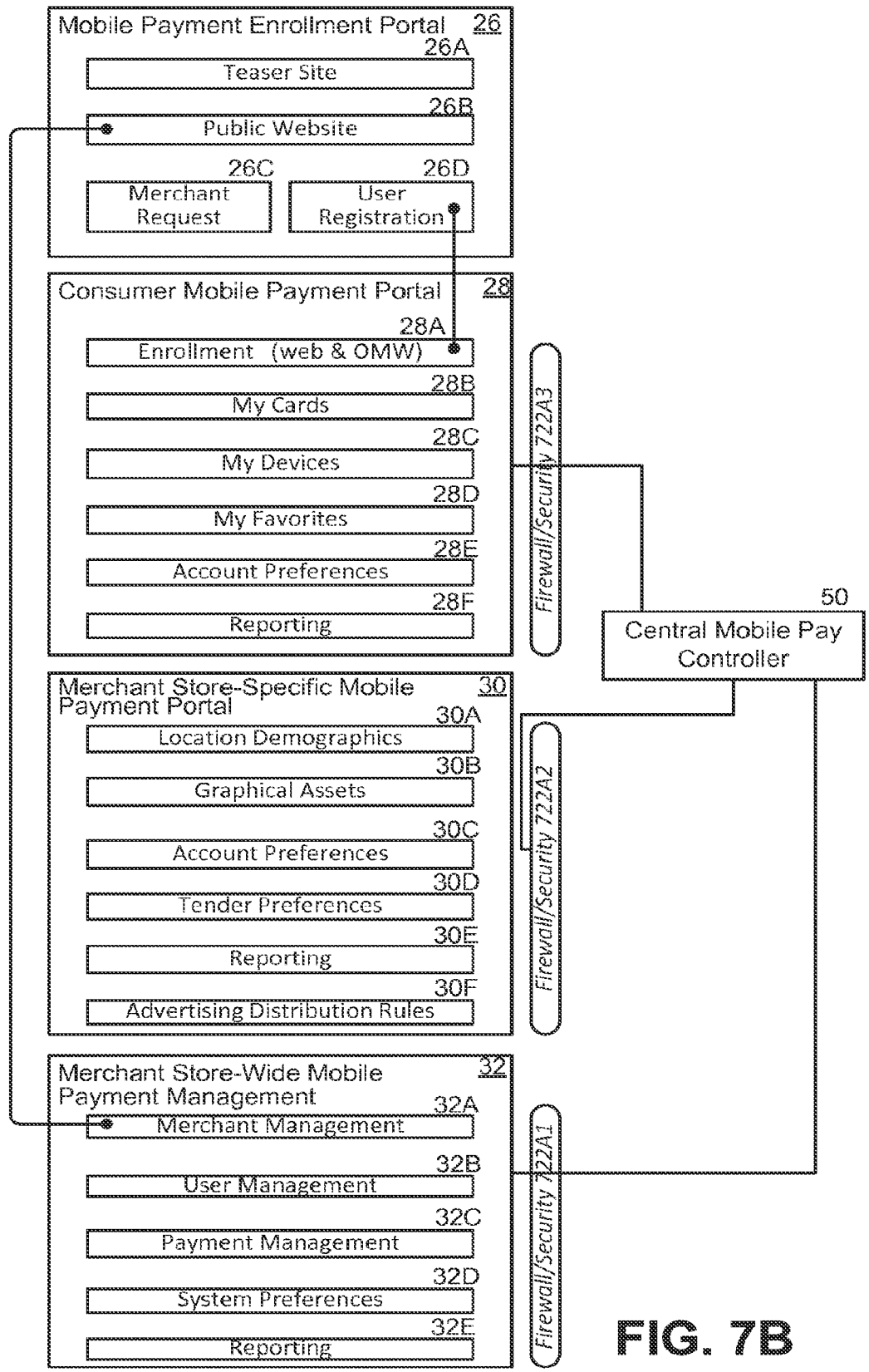
FIG. 7B is a diagram illustrating several on-line portals for managing the transaction management system 101 according to one exemplary embodiment of the invention.

FIG. 7B is a diagram illustrating several online portals 26-32 for managing the transaction management system 101 according to one exemplary embodiment of the invention. The transaction management system 101 may comprise a mobile payment enrollment portal 26, a consumer mobile payment portal 28, a merchant store-specific mobile payment portal 30, and a merchant store-wide mobile payment management portal 32. Each of these portals 26, 28, 30, 32 may be coupled to the central mobile payment controller 50.

While a direct connection as illustrated between the portals 26, 28, 30, 32 and the central mobile payment controller 50, one of ordinary skill in the art recognizes that this direct connection may be a virtual one that is established over the communications network 142. The communications between the central mobile payment controller 50 and each of the respective portals 26, 28, 30, 32 may be shielded with an appropriate firewall/security layer 722A as understood by one of ordinary skill in the art.

The mobile payment enrollment portal 26 may allow a consumer to open an account with their portable computing device 100. The mobile payment enrollment postal 26 may also allow a merchant to open account so that particular store locations may be managed by the transaction management system 101. The mobile payment enrollment portal 26 may comprise a teaser site module 26A, a public website module 26B, a merchant request module 26C, and a user registration module 26D. The merchant request module 26C may support the enrollment for a merchant who wishes to access the services provided by the transaction management system 101. The user registration module 26D may support the enrollment of individual consumers or operators of the PCDs 100.

The consumer mobile payment portal 28 may comprise an enrollment module 28A, a cards module 28B, a devices module 28C, a favorites module 28D, in account preferences module 28E, and a reporting module 28F.

The merchant store-specific mobile payment portal 30 may comprise a location demographics module 30A, a graphics assets module 30B, an account preferences module 30C, a tender preferences module 30D, a reporting module 30E, and an advertising distribution rules module 30F.

The merchant store-wide mobile payment management portal 32 may comprise a merchant management module 32A, a user management module 32B, a payment management module 32C, a system preferences module 32D, and a reporting module 32E.

Figure 7C:
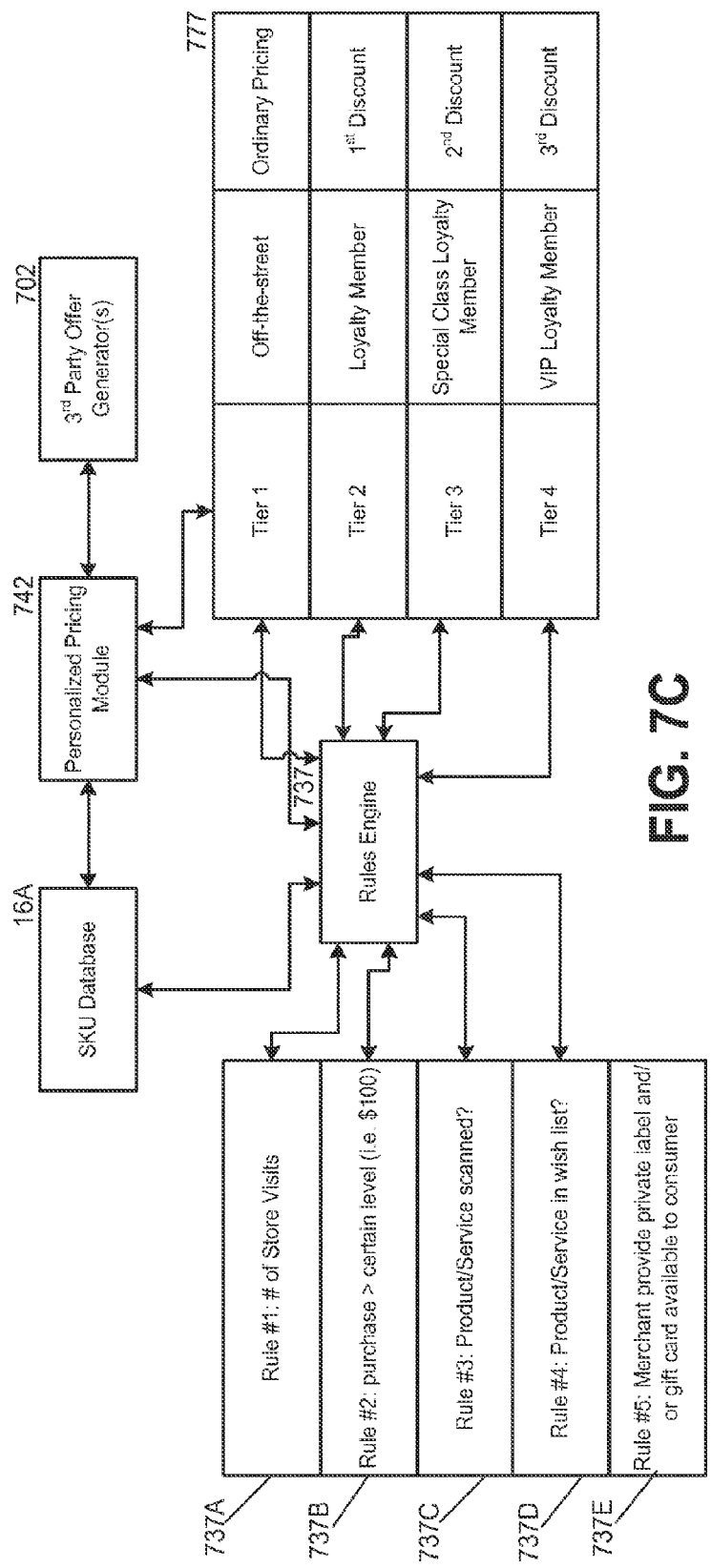
FIG. 7C is a diagram illustrating a price look-up ("PLU") table and an exemplary relationship among a rules engine and a personalized pricing module.

FIG. 7C is a diagram illustrating a price look-up ("PLU") table 777 and an exemplary relationship among the rules engine 737 and the personalized pricing module 742. Product/Service information may be retrieved by the personalized pricing module 742 from the merchant enterprise system 16, such as a SKU database 16A, in which these databases 16 supply the current price of a product/service to. However, the rules engine 737 with the personalized pricing module 742 in combination with CRM data from the merchant enterprise system 16 may set the price of a product/service which is personalized or customized for the PCD consumer.

For example, the rules engine 737 may review manufacturer rebates from the third party system 22, and specifically data from the manufacturer module 718 and/or third party offer generator(s) module 702. The rules engine 737 may also take into consideration the number of uses of the personalized shopping/payment application 113 by the PCD consumer, the detail or depth of product research conducted by the PCD consumer using the personalized shopping/payment application 113 (i.e. see Rules #3 737C, #4 737D), and if the PCD consumer has now reached a predetermined tier or level, such first tier or second tier of the PLU table 777 for certain discounts.

Therefore, a merchant may create a rule in the rules engine 737 that allows second tier PCD consumer to be offered a sale a week prior to the sale becoming public or storewide. In other words, the merchant may allow a second tier PCD consumer (Tier 2 in PLC table 777) a sale price much earlier than other consumers or customers, such as those consumer designated as first tier (Tier 1 of PLU table 777) PCD consumers.

The rules engine 737 and/or the personalized pricing module 742 may also take into consideration the form of payment selected by the mobile user. For example the mobile user may have a private label credit card account as well as a gift card (See Rule #5 737E of FIG. 7C). This combination of payment options being selected by the PCD consumer may trigger another threshold set by the rules engine 737 in order to provide the PCD consumer with additional discounts towards a transaction. The merchant, through the personalized shopping/payment application 113, may be able to give additional savings by sharing or absorbing some of the cost with processing the private label credit card account that is managed by the merchant or the merchant's processor 10.

In other words, with respect to discounts applied to the pricing data, a PCD consumer's loyalty or purchase history may place a PCD consumer into a particular tier or level for pricing in the PLU table 777. The PLU table 777 may have several tiers or levels within it as illustrated in FIG. 7C.

The lowest level for pricing discounts (which may not include any discounts at all—See Tier 1 of PLU table 777) may cover an ordinary consumer entering the merchant establishment for the first time, such as "off-the-street." This level may comprise an ordinary retail price.

The next level, such as Tier 2 of PLU table 777, may include PCD consumers who are characterized as "loyalty members" relative to the merchant in that they may have completed a transaction with a merchant previously and/or they have enrolled into a merchant's loyalty member program. These loyalty members, such as Tier 2 in PLU table 777, may be provided with a price for a product which is different, and lower relative to the lowest level or ordinary retail price, such as Tier 1 of PLU table 777.

The next level of pricing discounts above or supplemental to loyalty members at Tier 2 of PLU table 777 may include special classes of PCD consumers such as PCD consumers affiliated with military or consumers affiliated with a certain age bracket, such as senior citizens. See Tier 3 of PLU table 777.

Another class or level of PCD consumers may include those characterized as very important persons (VIPs) who may be characterized as such based on their purchase history or based on their volume of purchases or dollar spent in prior transactions with the merchant. See Tier 4 of PLU table 777.

Each of these levels may be stored in the PLC table 777 and may be associated with a certain SKU from the SKU database 16a. In other words, each SKU for a product and/or service may have a plurality of prices associated with it based upon the levels or tiers in PLU table 777 as described above.

Once the PCD consumer checks-in, the rules engine 737 in combination with the personalized pricing module 742 may check the loyalty status of the PCD consumer. As noted previously, a PCD consumer's loyalty status may be associated with a level in the PLU table 777 (i.e.—Tier 1 through Tier 4) as described above. The rules engine 737 may pull this price data from the PLU table 777 which may be maintained by a server operated by the merchant.

The rules engine 737 may then apply additional rules to the price data retrieved from the PLU table 777 in order to apply additional discounts. For example, a PCD consumer may have already enrolled into a loyalty program with a merchant. Therefore, the PCD consumer may be associated with the loyalty level of pricing for a product/service that is stored in the PLU table 777, such as Tier 2.

The merchant may establish or modify rules to apply to this loyalty level in the PLC table 777. For example, the merchant may establish a rule, such as Rule #1 737A, that applies an additional discount based on a number of visits to the merchant by the PCD consumer. As an example, for PCD consumers that visit a merchant more than ten times within a particular timeframe such as a month or quarter (three months), such a PCD consumer may be entitled to an additional five percent discount beyond the loyalty level price available to the PCD consumer at Tier 2 of PLU table 777. In other words, meeting a condition as defined by a rule, such as Rule #1 737A in combination with Tier 2 of the PLC table 777 may provide for additional discounts beyond the discount listed only for Tier 2 of PLC table 777.

Another exemplary rule may include, but is not limited to, one that applies an on top of the loyalty level price (i.e. Tier 2 of PLC table 777) or even on top of the merchant visit rule (i.e. Rule #1 737A) described. This exemplary rule (i.e. Rule #2 737B) may provide an additional discount such as another five percent off the price available to the PCD consumer for a PCD consumer who has purchased more than a certain dollar amount, such as $100, within a particular timeframe such as a month or a quarter (three months).

The personalized pricing module 742 may also conduct research on what are available other discounts that apply to the SKU of the product/service, such as manufacturer coupons, offers, rebates, and other similar discounts that can be retrieved from the third part offers/coupon database 22. The personalized pricing module 782 may automatically apply these other discounts without ever requesting input from the PCD consumer. For example, the personalized pricing module 742 may apply a manufacturer's rebate for a product such as a television.

So this means that in addition to any loyalty discounts applied to a product/service by the merchant, the personalized pricing module 742 may also apply a manufacture's rebate towards this personalized price of a product or service for a PCD consumer.

Figure 7D:
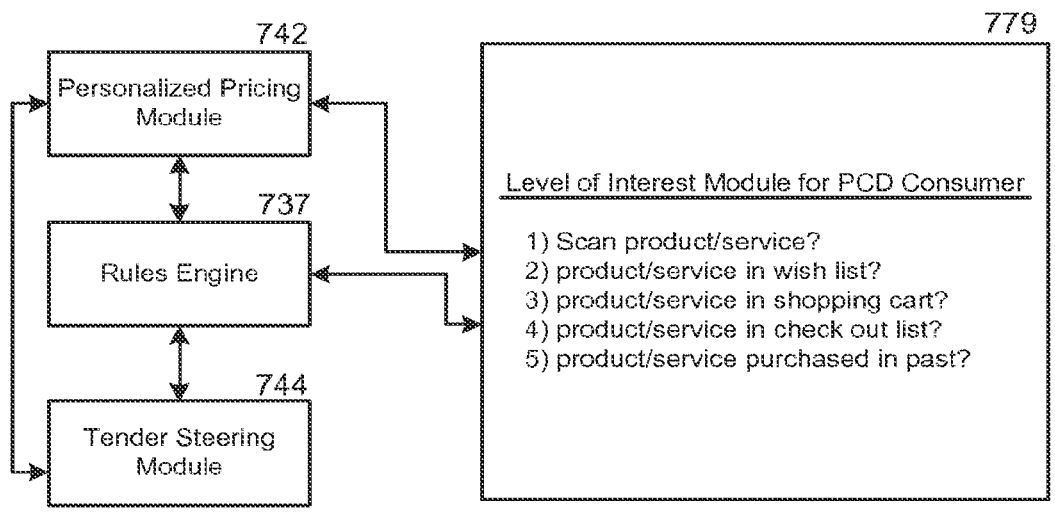
FIG. 7D is a diagram illustrating a level of interest module and exemplary relationships among the personalized pricing module, the rules engine, and a tender steering module.

FIG. 7D is a diagram illustrating a level of interest module 779 and exemplary relationships among the personalized pricing module 742, the rules engine 737, and the tender steering module 744. With the level of interest module 779, the personalized pricing module 742 may track levels of interest in a particular product or service by a PCD consumer. The personalized pricing module 742 may gauge a PCD user's level of interest in a product or service by tracking if the PCD consumer performs any one of the following actions: 1) scanning the barcode of the product or service to display its price, 2) reviewing a wish list of products or services that have been created by the PCD consumer, 3) determining if the product or service was ever placed into the virtual shopping cart or virtual shopping basket of the PCD consumer, and 4) if the product or service was ever being checked out during a transaction but never actually purchased by the PCD consumer, and 5) if the PCD consumer actually purchased such a product or service in the past from the merchant.

A wish list may be created by the PCD consumer during a shopping experience for those products or services that the PCD consumer desires but may not be able to purchase currently for one reason or another (i.e. lack of funds, etc.). The personalized pricing module 742 and/or the personalized shopping/payment application 113 may manage and support this wishlist. Further details of an exemplary wishlist are illustrated in FIG. 11B described below.

A virtual shopping cart or virtual shopping basket may contain those products or services desired by the PCD consumer to be purchased prior to leaving a merchant location. The personalized pricing module 742 and/or the personalized shopping/payment application 113 may manage and support this virtual shopping basket/cart. Further details of an exemplary shopping cart/basket are illustrated in FIG. 11B described below.

The rules engine 737 in combination with the personalized pricing module 742 and the level of interest module 770 may work together to assess one or more different details related to the level of interest in a product and/or service for each PCD consumer. For example, one rule of the rules engine 737 may define a visit for an establishment of a merchant as requiring at least two barcode scans for two different products within the establishment of the merchant. Such a rule may eliminate counting a visit for a mobile user who merely "checks-in" or walks into the establishment of the merchant without ever looking or reviewing products or services available at the merchant.

Another rule within the rules engine 737 may be set by another merchant that requires at least one purchase by the PCD consumer to constitute a visit to the establishment of the merchant. Another exemplary rule may weigh-in each of the levels of interest factors noted above, by assigning values such as weighted percentages. For example, one exemplary rule may provide an additional discount for a PCD user if the rules engine 737 determines that the PCD consumer has conducted product scans previously with his or her PCD 100 and has maintained a wishlist of the same products with their PCD 100 and when that wishlist has decreased upon subsequent visits by the PCD consumer in the establishment of the merchant. In such a scenario, the rules engine 737 may execute an algorithm that deduces that it is likely that the PCD consumer has purchased items in his or her wishlist since the wishlist quantity has decreased.

In summary of the relationships described above and illustrated in FIGS. 7C-7D, the rules engine 737 in combination with the personalized pricing module 742 may track at least one or more of the following aspects PCD consumer data: real-time assessment of the PCD consumer; records of past transactions made by the PCD consumer; accessing real-time rebates and/or discounts from third parties; and the rules engine 737 in combination with the personalized pricing module may work with the tender steering module 744 for assisting the PCD consumer with payment options for a transaction that may afford a PCD consumer with additional discounts towards products and/or services to be purchased.

The personalized pricing module 742, level of interest module 779, rules engine 737, and tender steering module 744 may comprise software or hardware or both. While each of these components has been illustrated as a separate and distinct processing entity, one of ordinary skill in the art recognizes that all of the components may be combined into and/or executed by a single processing entity.

Figure 7E:
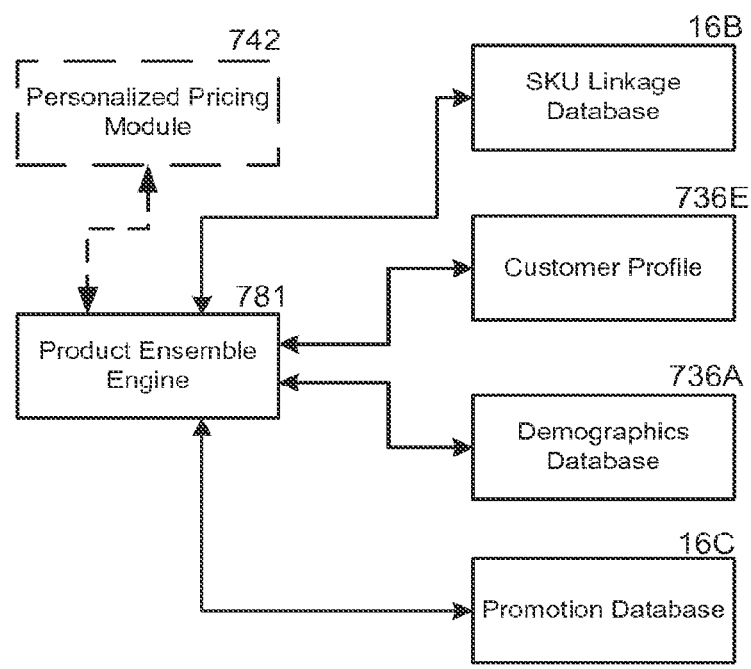
FIG. 7E is a diagram illustrating details of a product ensemble engine that may assist with providing a personalized shopping experience.

FIG. 7E is a diagram illustrating details of a product/service ensemble engine 781 that may assist with providing a personalized shopping experience. The product/service ensemble engine 781 may suggest additional products and/or services that may be related to products/services 44 that have been scanned-in by the PCD consumer and/or those that are maintained in a wishlist for the PCD consumer. The product ensemble engine 781 may be coupled to the personalized pricing module 742 illustrated with dashed lines in FIG. 7E. Like the personalized pricing module 742, the product ensemble engine may comprise software or hardware or both.

There may be at least four data regions tracked with the product ensemble engine 281: 1) cross sell—SKU linkage databases 16B; 2) customer preferences or profiles 736; 3) a demographics database 736A; and 4) a promotion database 16C. Cross sell stock keeping unit ("SKU") linkage databases 16B may be generated by each merchant. For example, a merchant may link the SKU of a first product to the SKU of a second product. More specifically, a first product that includes a television set may have its SKU link to the SKU of electrical cables, such as HDMI cables.

A SKU linkage may involve more than one product and may include a series of products such as a first product which has an SKU linkage to a plurality of other SKUs of other second products. The products may be any type of product: from hard products like electronics to soft products like clothing. For soft products, a first clothing product such as a shirt may be linked to two or more different types of pants and shoes. These suggestions sets may be formulated by the merchant and not third parties. However, third parties, in other exemplary embodiments, such as manufacturers of the products/services 44, may also form SKU linkage databases 16B. These SKU linkage databases 16B, as part of an inventory system of a merchant, may be accessed by the ensemble engine 781.

Customer profiles 736E, which may be accessed by the produce ensemble engine 781, may generally involve prior purchases made by the PCD consumer. These prior purchases are generally tied to a single merchant and not multiple merchants. However, in other exemplary embodiments, if two or more merchants decide to share data, then it is possible to review prior purchases across more than one merchant.

A demographics database 736A, which may also be accessed by the ensemble engine 781, may includes a review of the demographics of the PCD consumer compared to purchases made by other consumers with the merchant having similar demographics (gender, race, age, etc.). As part of a registration process for the personalized shopping/payment application 113, the PCD user may be requested to enter demographic information about his or herself that can be used in combination with the demographics database 736A by the ensemble engine 781.

The promotion database 16C may comprise products/services 44 that a merchant wants to get rid of from his or her establishment. A merchant may be able to entice PCD consumers with excess inventory items with the ensemble engine 781 that may suggest these products to the PCD consumer.

Figure 8:
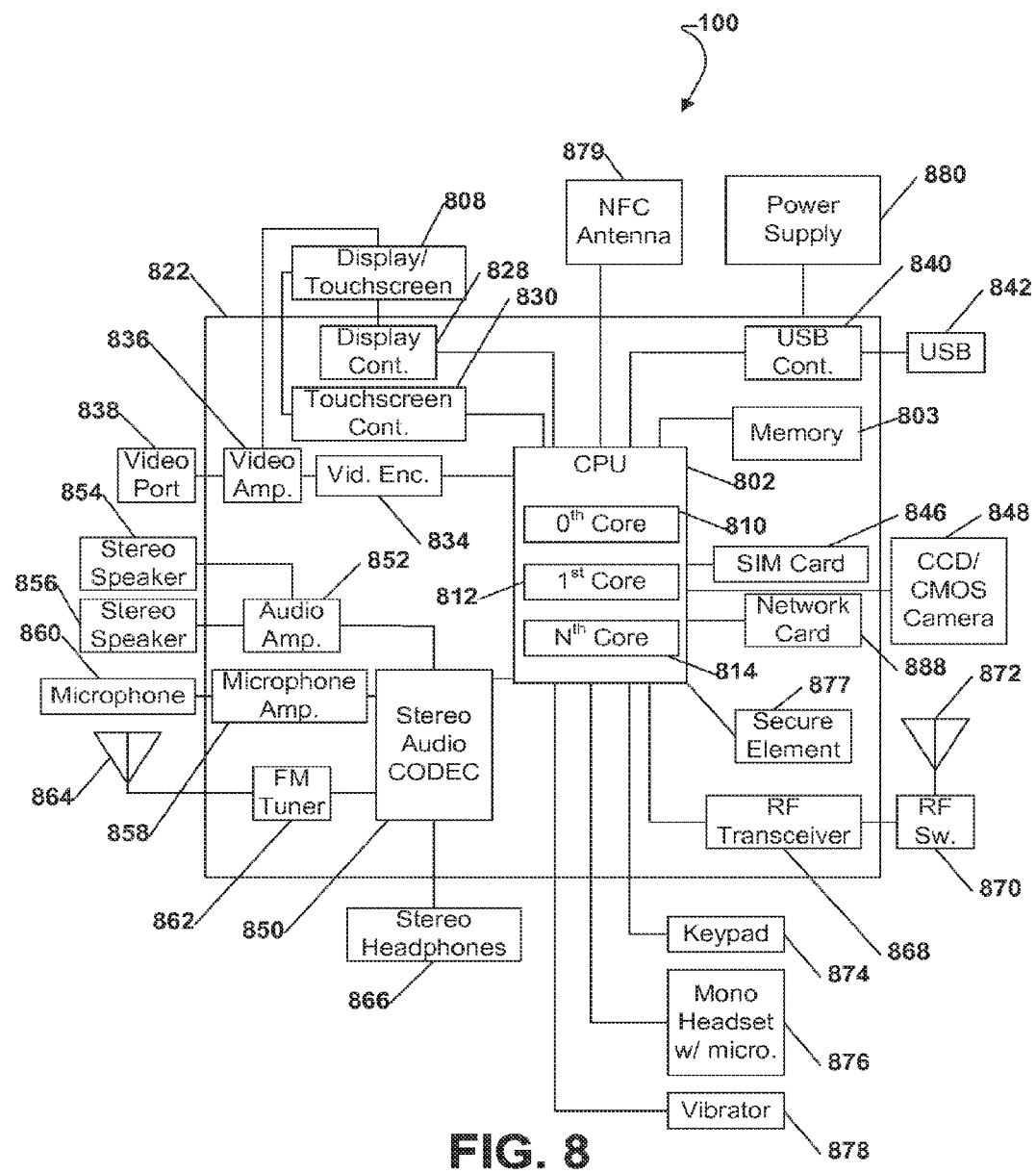
FIG. 8 is a functional block diagram illustrating an exemplary portable computing device.

Referring to FIG. 8, an exemplary, non-limiting aspect of a portable computing device ("PCD") is shown and is generally designated 100. As shown, the PCD 100 includes an on-chip system 822 that includes a multicore CPU 802. The multicore CPU 802 may include a zeroth core 810, a first core 812, and an Nth core 814.

As illustrated in FIG. 8, a display controller 828 and a touch screen controller 830 are coupled to the multicore CPU 802. In turn, a display 808 external to the on-chip system 822 is coupled to the display controller 828 and the touch screen controller 830. An NFC antenna 879 may be coupled to the CPU 802 and may support functions that work in combination with a secure element module 877. The secure element module 877 may comprise software and/or hardware and/or firmware as understood by one of ordinary skill in the art.

FIG. 8 further shows that a video encoder 834, e.g., a phase alternating line ("PAL") encoder, a sequential color a memoire ("SECAM") encoder, or a national television system(s) committee ("NTSC") encoder, is coupled to the multicore CPU 802. Further, a video amplifier 836 is coupled to the video encoder 834 and the touch semen display 108. Also, a video port 838 is coupled to the video amplifier 836. As shown in FIG. 8, a universal serial bus ("USB") controller 840 is coupled to the multicore CPU 802. Also, a USB port 842 is coupled to the USB controller 840. Memory 404A and a subscriber identity module ("SIM") card 846 may also be coupled to the multicore CPU 802.

Further, as shown in FIG. 8, a camera 848 may be coupled to the multicore CPU 802. In an exemplary aspect, the camera 848 is a charge-coupled device ("CCD") camera or a complementary metal-oxide semiconductor ("CMOS") camera.

As further illustrated in FIG. 8, a stereo audio coder-decoder ("CODEC") 850 may be coupled to the multicore CPU 802. Moreover, an audio amplifier 852 may coupled to the stereo audio CODEC 850. In an exemplary aspect, a first stereo speaker 854 and a second stereo speaker 856 are coupled to the audio amplifier 852. FIG. 8 shows that a microphone amplifier 858 may be also coupled to the stereo audio CODEC 850. Additionally, a microphone 860 may be coupled to the microphone amplifier 858. In a particular aspect, a frequency modulation ("FM") radio tuner 862 may be coupled to the stereo audio CODEC 850. Also, an FM antenna 864 is coupled to the FM radio tuner 862. Further, stereo headphones 806 may be coupled to the stereo audio CODEC 850.

FIG. 8 further illustrates that a radio frequency (RF) transceiver 868 may be coupled to the multicore CPU 802. An RF switch 870 may be coupled to the RF transceiver 868 and an RF antenna 872. As shown in FIG. 4C, a keypad 874 may be coupled to the multicore CPU 802. Also, a mono headset with a microphone 860 may be coupled to the multicore CPU 802. Further, a vibrator device 878 may be coupled to the multicore CPU 802. FIG. 8 also shows that a power supply 880 may be coupled to the on-chip system 822. In a particular aspect, the power supply 880 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 8 further shows that the PCD 100 may also include a network card 888 that may be used to access a data network, e.g., a local area network, a personal area network, or any other network. The network card 888 may be a Bluetooth network card, a WiFi network card, a personal area network (PAN) card, a personal area network ultra-low-power technology (PeANUT) network card, or any other network card well known in the art. Further, the network card 888 may be incorporated into a chip, i.e., the network card 888 may be a full solution in a chip, and may not be a separate network card 888.

As depicted in FIG. 8, the display 808, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator device 878, and the power supply 880 are external to the on-chip system 822.

In a particular aspect, one or more of the method steps described herein may be stored in the memory 803 as well as in the central mobile payment controller 50, merchant enterprise system 16, merchant POS system 12, and other storage devices as computer program instructions. These instructions may be executed by the multicore CPU 802, central mobile payment controller 50, merchant enterprise system 16, and merchant POS system 12 in order to perform the methods described herein. Further, the multicore CPU 802, merchant enterprise system 16, merchant POS system 12, other storage devices, and memory 803 of the PCD 100, or a combination thereof may serve as a means for executing one or more of the method steps described herein.

Figure 9A:
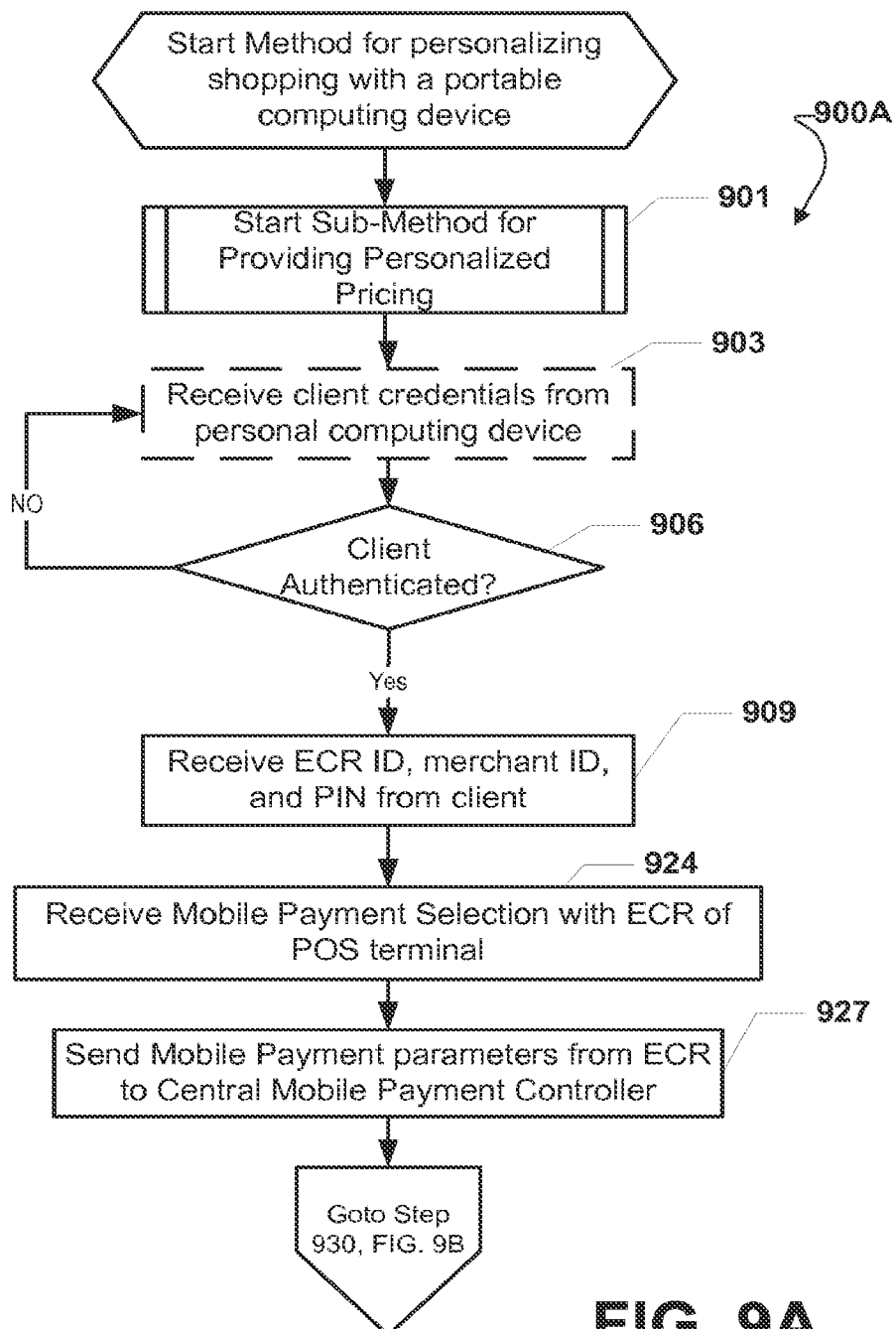
FIGS. 9A-9E are flowcharts illustrating a method for managing transactions with a PCD.

FIG. 9A is a flowchart illustrating a method 900A for managing transactions with a PCD 100. Routine or sub-method block 901 is the first step in the process 900 for managing transactions with the PCD 100. In routine or submethod block 901, personalized pricing for products and/or services may be provided by the personalized shopping/payment application 113 in combination with the rules engine 737 and personalized pricing module 742. As noted previously, the personalized shopping/payment application, 113 may be running on a portable computing device ("PCD"), like a mobile phone, while the rules engine 737 and personalized pricing module are executed by a server, such as the central mobile payment controller 50 as illustrated in FIG. 1. Further details of routine 901 will be described in better detail below in connection with FIG. 9F.

After block 901, in optional block 903, client credentials entered in screens 202A and 202B of FIGS. 2A-2B may be received by the central mobile payment controller 50 from the portable computing device (PCD) 100. As noted previously, the client credentials may comprise a user name 204, a password or personal identification number ("PIN") 206, and a unique identifier assigned to the PCD 100. Block 903 is highlighted with dashed lines in FIG. 9A to indicate that this block is optional. Block 903 is optional because a PCD consumer may enter his or her client credentials in routine block 901, and specifically, in block 1105 of FIG. 9F. In some exemplary embodiments, the client personalized shopping/payment application 113 may require client credentials again in block 903 for more secure operation when a PCD consumer desires to check-out products and/or services for purchase with the PCD 100.

Next, in decision block 906, the central mobile payment controller 50 determines if the client is authenticated based on the credentials that it received in block 903. In this decision block 906, the central mobile payment controller 50 may verify that the user name 204 of screen 202A matches the unique client identifier assigned to the PCD 100 which is maintained in the system datastore module 734 of FIG. 7A. The system datastore module 734 may comprise a client database containing client profiles associated with PCDs 100. If the central mobile payment controller 50 verifies that the user name 204 matches the client unique identifier assigned to the PCD 100, then the central mobile payment controller 50 checks to see if the password or PIN 206 of screen 202B matches the user name 204 of screen 202A based on a review of the client profile stored in the system datastore module 734.

If the inquiry to decision block 906 is negative, then the "No" branch is followed back to block 903 for receiving the client's credentials for a predetermined number of times. If the inquiry to decision block 906 is positive, then the "Yes" branch is followed to block 909 in which the ECR 412 or terminal identifier, merchant identifier, and PIN are received from the PCD 100. In this block 909, the PCD 100 may conduct a scan of the tag 124 that comprises the machine-readable code 222 which contains the ECR 412 or terminal identifier as well as the merchant identifier.

Next, in block 924, the central mobile payment controller 50 may receive a signal from the ECR 412 of the merchant POS system 12 that a mobile payment option has been selected. This signal is usually generated by an employee of the merchant who is operating the ECR 412.

Next, in block 927, one or more mobile payment parameters and the product scan data may be sent from the ECR 412 to the central mobile payment controller 50. The one or more mobile payment parameters may comprise a total due, a transaction identifier, a terminal identifier, a merchant identifier, and the sequence number. The process then continue continues to block 930 of FIG. 9B.

Figure 9B:
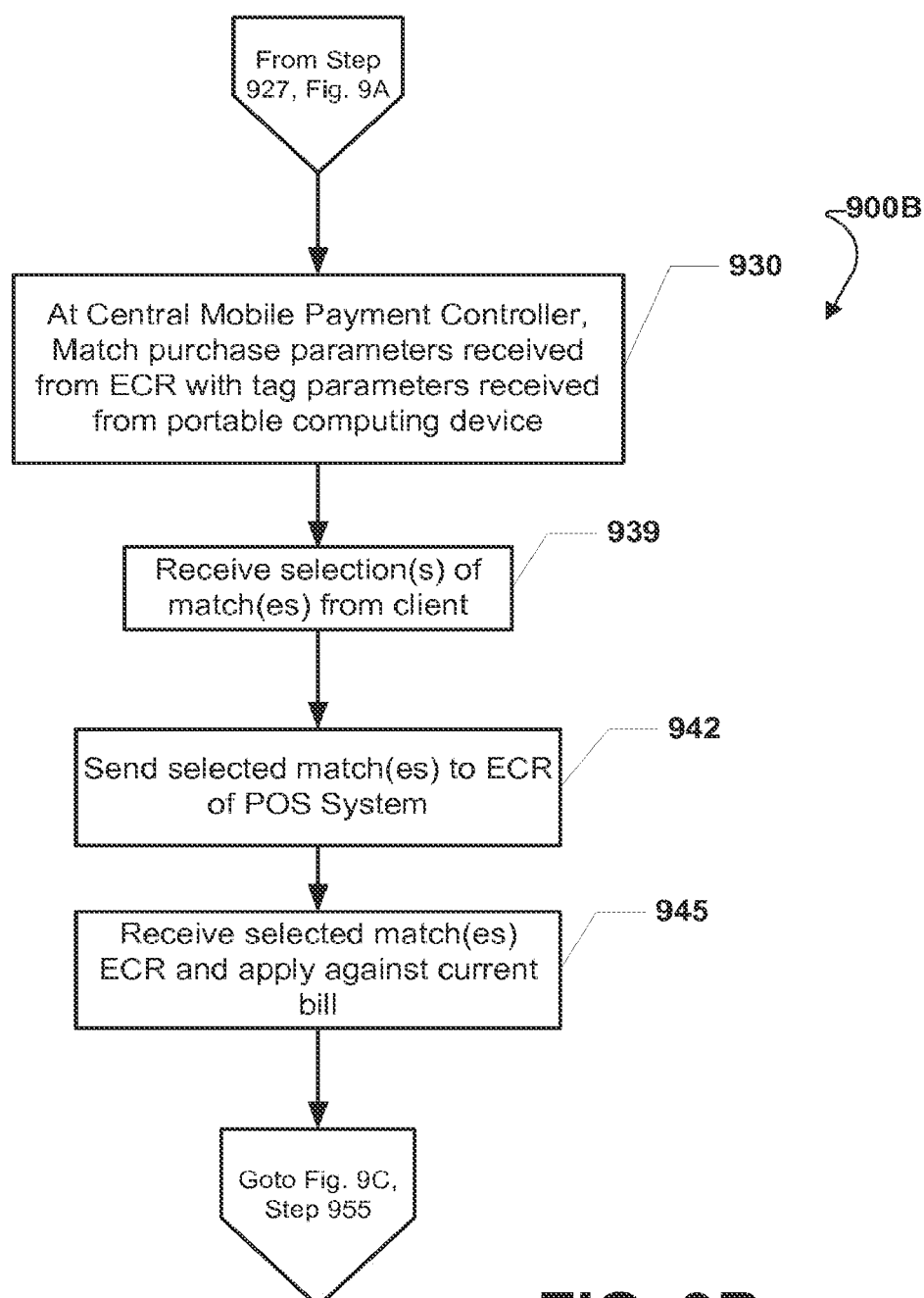

FIG. 9B is a continuation flowchart corresponding to the flowchart of FIG. 9A which illustrates a method 900B for managing transactions with a PCD 100. Block 930 is the first block of this continuation flowchart for managing transactions with the PCD 100. In block 930, the central mobile payment controller 50 matches the purchase parameters received from the ECR 412 with the parameters from the tag 124 received from the portable computing device. As noted previously, the purchase parameters received from the ECR 412 may comprise the total amount due for the transaction, a transaction identifier, a terminal identifier, a merchant identifier, and a sequence number. The parameters from the tag 124 relayed by the portable computing device 100 may comprise a terminal identifier, the merchant identifier, and the PIN for the portable computing device 100. If these two sets of parameters do not match, the central mobile payment controller 50 would stop the transaction from being completed and would not display any options for payment on the portable computing device 100.

Next, in block 930, the central mobile payment controller 50 may receive one or more selection(s) of coupon or rebate match(es) from the PCD 100 in response to the operator of PCD 100 selecting one or more options displayed in screen 202F of FIG. 2F. As noted previously, coupon or rebate matches may be automatically applied without requiring input from the PCD consumer. In block 942, the central mobile payment controller 50 sends any coupon or rebate match(es) over the communications network 142 and the communication links 103 to the ECR 412 of the merchant POS system 12. The process then proceeds to block 955 of FIG. 9C.

Figure 9C:
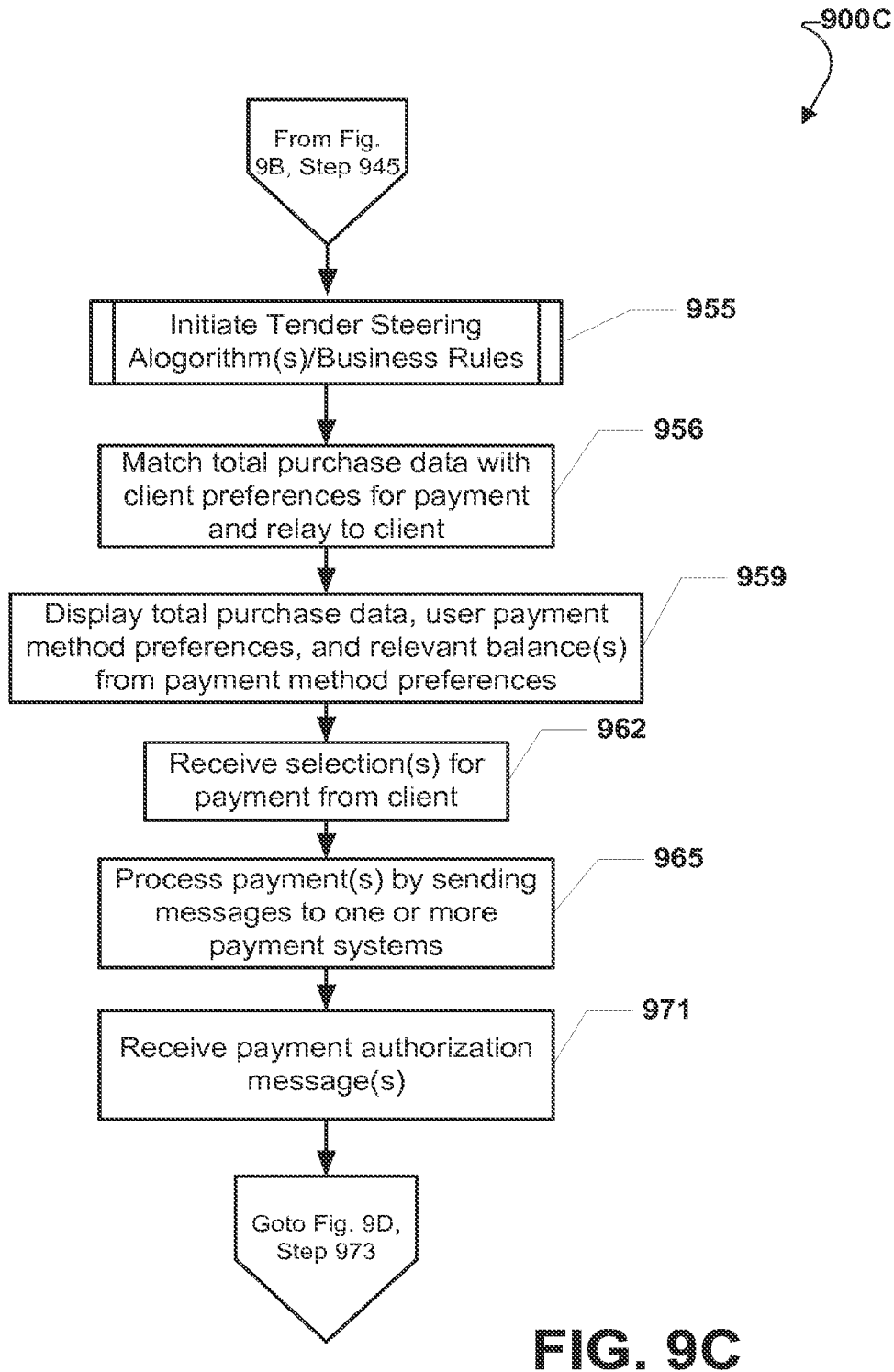

FIG. 9C is a continuation flowchart corresponding to the flowchart of FIG. 9B which illustrates a method 900C for managing transactions with a PCD 100. Routine or submethod block 955 is the first block of method 900C. In routine or submethod block 955, the central mobile payment controller 50 may initiate one or more tender steering algorithms or business rules with respect to payment options for the operator of the PCD 100. Further details of routine 955 will be described below in connection with FIG. 9E. Next, in block 956, the central mobile payment controller 50 may match the total due with the payment options selected by the tender steering module 744 of FIG. 7A as described above. The central mobile payment controller 50 may then relay these payment methods to the PCD 100.

In block 955, the total purchase data, optional payment methods generated by the tender steering module 744, and relevant balances from the payment methods may be displayed. For example, see screen 202G as illustrated in FIG. 2G and generally designated by reference numeral 218A. As other examples, see screens 1200A and 1200B of FIGS. 12A-12B. Next, in block 962, the central mobile payment controller 50 may receive one or more selection(s) for the payment methods over the communications network 142 from the PCD 100 based on selections made by the operator of PCD 100.

Next, in block 965, the central mobile payment controller 50 may process the selected payment methods by sending messages to one or more payment systems 18 and 20 via the gateway 14 and/or the merchant enterprise system 16. Specifically, the central mobile payment controller 50 may send messages to the gateway 14 if one or more alternative payment systems 18, such as, but not limited to, PAYPAL™ brand of online financial payment solutions and SPRINT™ brand of mobile telephone networks, have been selected by the operator of the PCD 100 for paying the final amount due for a purchase. The central mobile payment controller 50 may also send information related to traditional payment systems 20, such as, but not limited to conventional credit card accounts via the communications network 142.

Next in block 971, the central mobile payment controller 50 may receive payment authorizations from any of the payment systems 18 and 20. The process then continues to block 973 of FIG. 9D.

Figure 9D:
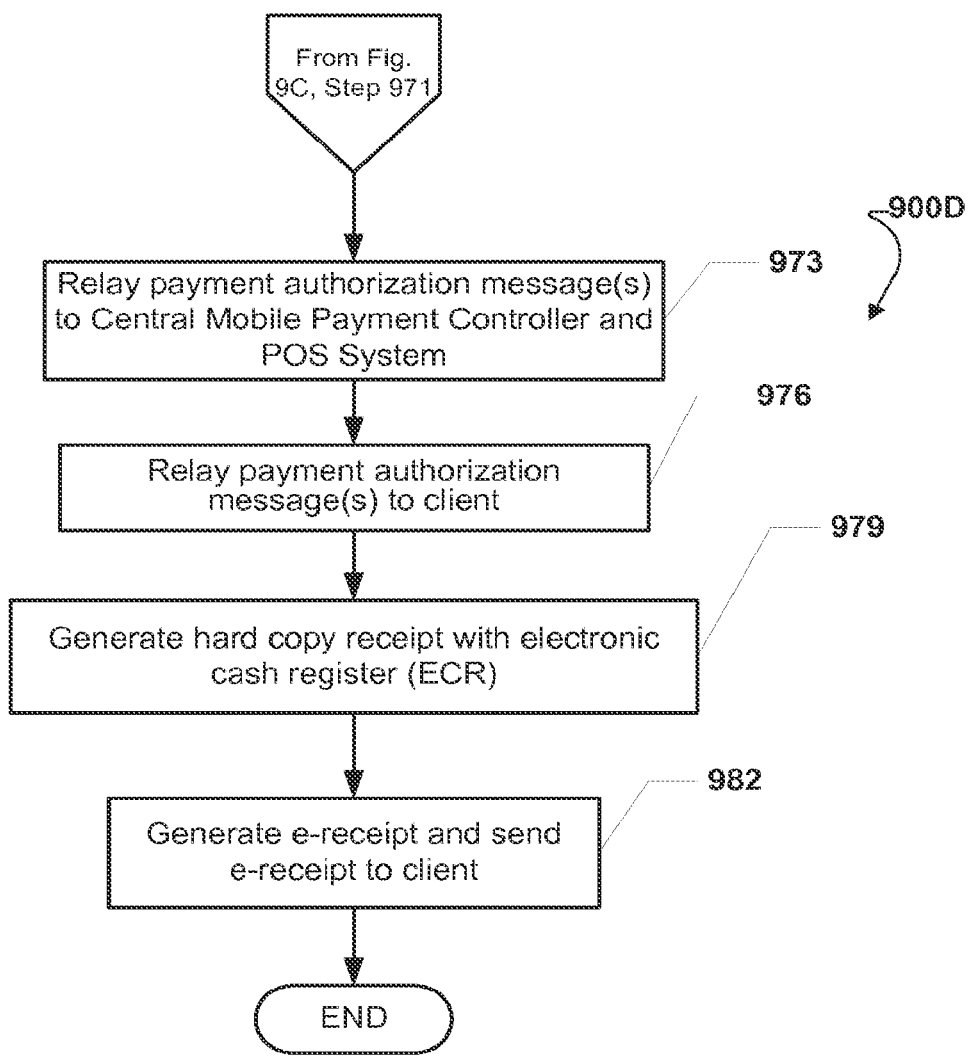

FIG. 9D is a continuation flowchart corresponding to the flowchart of FIG. 9C which illustrates a method 900D for managing transactions with a PCD 100. Block 973 is the first block of this continuation flowchart for managing transactions with the PCD 100. In block 973, the central mobile payment controller 50 may relay the payment authorization messages from the alternative payment systems 18 and traditional payment systems 20 to the ECR 412 of the merchant POS system 12 via the merchant enterprise system 16. In block 976, the central mobile payment controller 50 may also relay the payment authorization messages from the alternative payment systems 18 as well as the payment authorization messages from the traditional payment systems 20 over the communications network 142 to the PCD 100.

Next, in block 979, the electronic cash register ("ECR") 412 of the merchant POS system 12 may generate a hard copy receipt 127. Similarly, in block 982, the central mobile payment controller 50 may generate an electronic receipt and send it over the communications network 142 to the PCD 100 for display on the display 808 of the PCD 100 as illustrated in screen 202H of FIG. 2H. The process then ends.

The system 101 may generally support businesses such as restaurants or other establishments which may provide products as well as services and which usually do not employ a product scanner 132 coupled to ECR 412. In this exemplary operating environment, other differences include ECR 412 not being present. However, one of ordinary skill in the art recognizes that in some restaurant environments, depending upon the owner's preferences, may include ECR 412 without departing from the scope of this disclosure. In some restaurant environments, terminals may provided and are coupled to the store controller 410. The terminals may comprise token readers, such as magnetic-stripe readers, attached to or integral with the housing of the terminals as understood by one of ordinary skill in the art.

Figure 9E:
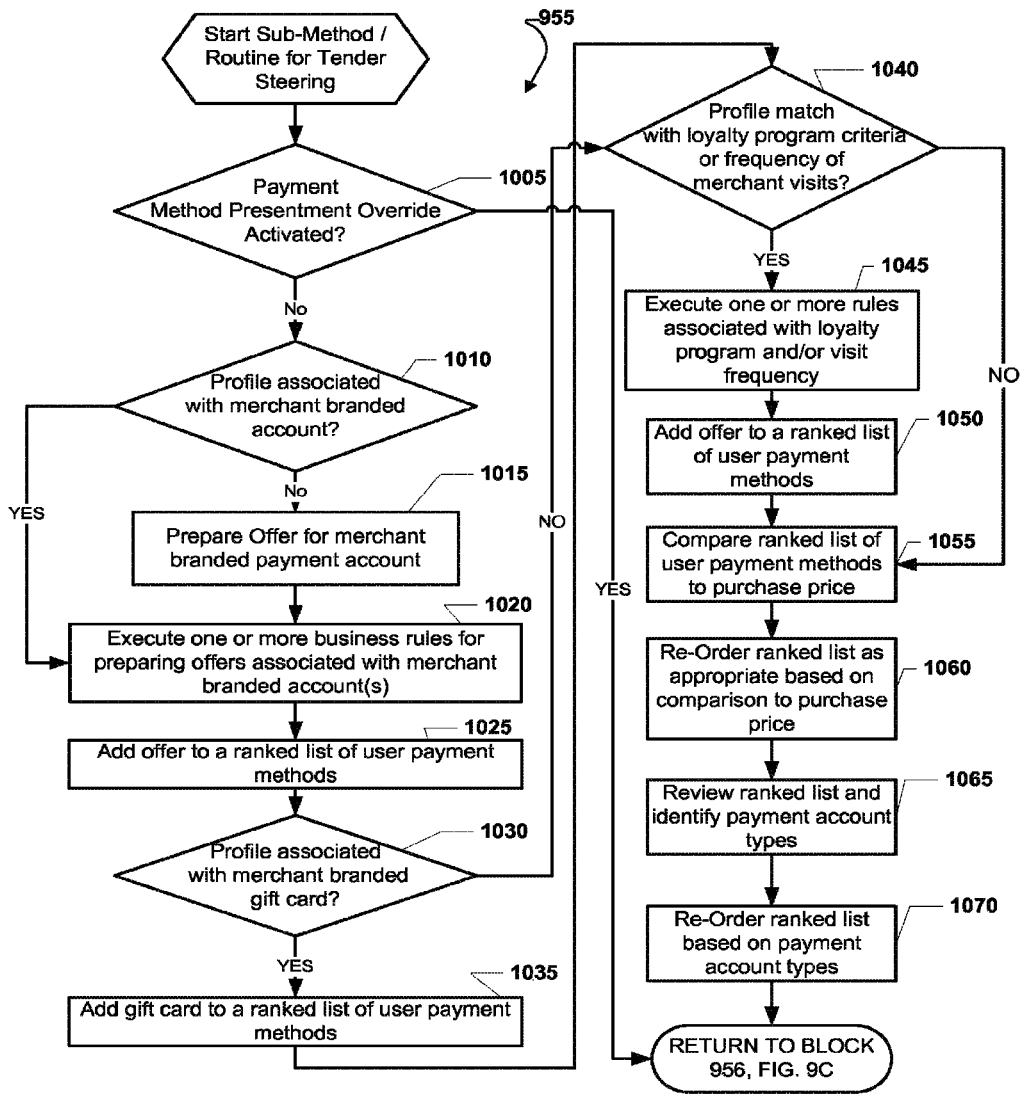

FIG. 9E is a flowchart illustrating a routine or submethod 955 of FIG. 9C for tender steering which is executed by the tender steering module 744 of FIG. 7A. Decision block 1005 is the first block of submethod 955. In decision block 1005, the tender steering module 744 determines if the payment method presentment override feature or function has been activated by the operator of the PCD 100. Decision block 1005 corresponds with the preferences module 3140 of FIG.

3B as described above. If the inquiry to decision block 1005 is positive, then the "YES" branch is followed to block 956 of FIG. 9C. If the inquiry to decision block 1005 is negative, then the "NO" branch is followed to decision block 1010.

In decision block 1010, the tender steering module 744 determines if the profile of the PCD 100 associated with a merchant branded account, such as a merchant branded credit card like a merchant named (i.e. a department store name) MASTERCARD™ brand or VISA™ brand credit card account. If the inquiry to decision block 1010 is positive, then the "YES" branch is followed to block 1020. If the inquiry to decision block 1010 is negative, then the "NO" branch is followed to block 1015.

In block 1015, the tender steering module 744 alone or in combination with other modules, such as the loyalty transport module 740 and the merchant loyalty module 724 of FIG. 7A, may prepare one or more offers for a merchant branded payment account, like a merchant named (i.e. a department store name) MASTERCARD™ brand or VISA™ brand credit card account. In this block 1015, the tender steering module 744 may determine an account type to offer the operator or profile associated with the portable computing device 100. Next, the tender steering module 744 in block 1020 may execute one or more business rules for preparing offers that may be associated with the merchant branded payment account.

For example, the tender steering module 744 may determine if the merchant should offer a certain percentage discount to be applied against the purchase price of the services and/or merchandise should the operator of the PCD 100 decide to use the merchant branded payment account. Specifically, the tender steering module 744 may generate an offer such as 10% off or 20% off the total purchase price if the operator of the PCD 100 chooses the merchant branded payment account to complete the purchase.

The one or more offers in block 1025 may be added to a ranked list of user payment methods. In this block 1025, the tender steering module 744 may range all available payment options for the operator of the PCD 100 according to a ranking, such as, but not limited to, putting each payment method in a sequence according to the level of benefit relative to the merchant. In this way, the tender steering module 744 may present those payment options with the highest benefit to the merchant to be presented first while the payment options with the lowest benefit are saved for the very end or are positioned at or near the end of the list.

In decision block 1030, the tender steering module 744 may determine if the profile of the PCD 100 is associated with a merchant branded gift card account. As noted previously, one objective for this decision block 1030 is to identify all gift card accounts in possession of the operator so that the operator may have the opportunity to clear or use low value gift cards against a purchase in combination with other forms of payment, such as a credit card payment.

If the inquiry to decision block 1030 is negative, then the "NO" branch is followed to decision block 1040. If the inquiry to decision block 1030 is positive, then the "YES" branch is followed to block 1035. In block 1035, the one or more gift card accounts associated with the profile of the PCD 100 are added to the ranked list of user payment methods. In this block 1035, the tender steering module may also arrange or reorganize the ranked list such that the one or more gift card accounts are appropriately positioned among the other payment accounts available to the profile of the PCD 100.

As noted previously, it is usually very beneficial for the merchant to have the operator of the PCD 100 used a gift card account says the merchant will likely not pay any interchange fees that are often associated with other payment accounts like credit card accounts. Therefore, the tender steering module 744 would usually put gift card accounts ahead of non-merchant branded credit card accounts or elite status credit card accounts which may command significantly higher interchange rates from the merchant.

Next, in decision block 1040, the tender steering module 744 may also determine if the profile associated with the PCD 100 matches any loyalty program data and/or if the profile of the PCD 100 has reached a certain frequency of visits with a merchant. In this decision block 1040, the tender steering module may work in combination with the loyalty transport modules 140 and the merchant loyalty module 724 as illustrated in FIG. 7A.

If the inquiry to decision block 1040 is positive, then the "YES" branch is followed to block 1045. If the inquiry to decision block 1040 is negative, then the "NO" branch is followed to block 1055. In block 1045, the tender steering module 744 may execute one or more business rules associated with the loyalty program and or a number of visits associated with the profile of the PCD 100 relative to the merchant. From these business rules, the tender steering module 744 may provide one or more additional offers associated with merchant branded payment accounts and/or merchant branded gift card accounts.

In block 1050, a tender steering module 744 may add the one or more offers to the ranked list of user payment methods. Subsequently, in block 1055, the tender steering module 744 may compare the ranked list of user payment methods against the purchase price of the merchandise and/or services. In this block 1055, the tender steering module 744 may compare fixed fees associated with one or more payment accounts against percentage-based fees associated with one or more other payment accounts.

As noted in an a previous example, if a consumers final purchase price is $1.03 and his debit card charges a fixed fee of $0.50 per transaction to the merchant while the gift card account may only charge 5% of the transaction to the merchant, then the tender steering module 744 may strongly favor or present the gift card as the top choice for the consumer on the portable computing device instead of the higher fee debit card relative to the final purchase price.

In block 1060, the tender steering module 744 may reorder the ranked list as appropriate based on the aforementioned comparison to the purchase price. In block 1065, the tender steering module 744 may review the ranked list and identify the various payment account types that are available to the operator of the PCD 100. Specifically, the tender steering module 744 may review the first six digits of payment accounts available to the consumer and then determine a status of the payment account such as its benefits level (i.e. whether the payment account qualifies as a gold level, a platinum level, etc.) and what corresponding interchange rates may apply based on that benefits level.

Depending upon what fees will be assessed for the merchant for a particular payment account, the tender steering module 744 may organize or sequence the payment accounts in block 1070 in order from least expensive to most expensive relative to the fees assessed against the merchant for each payment account. Specifically, in block 1070, the tender steering module 744 may reorder the ranked list from block 1050 again based on payment account types, such as putting forward merchant branded gift card accounts first, merchant branded credit card accounts next, followed by non-merchant branded other types of payment accounts. The submethod or routine 955 returns to block 956 of FIG. 9C.

Figure 9F:
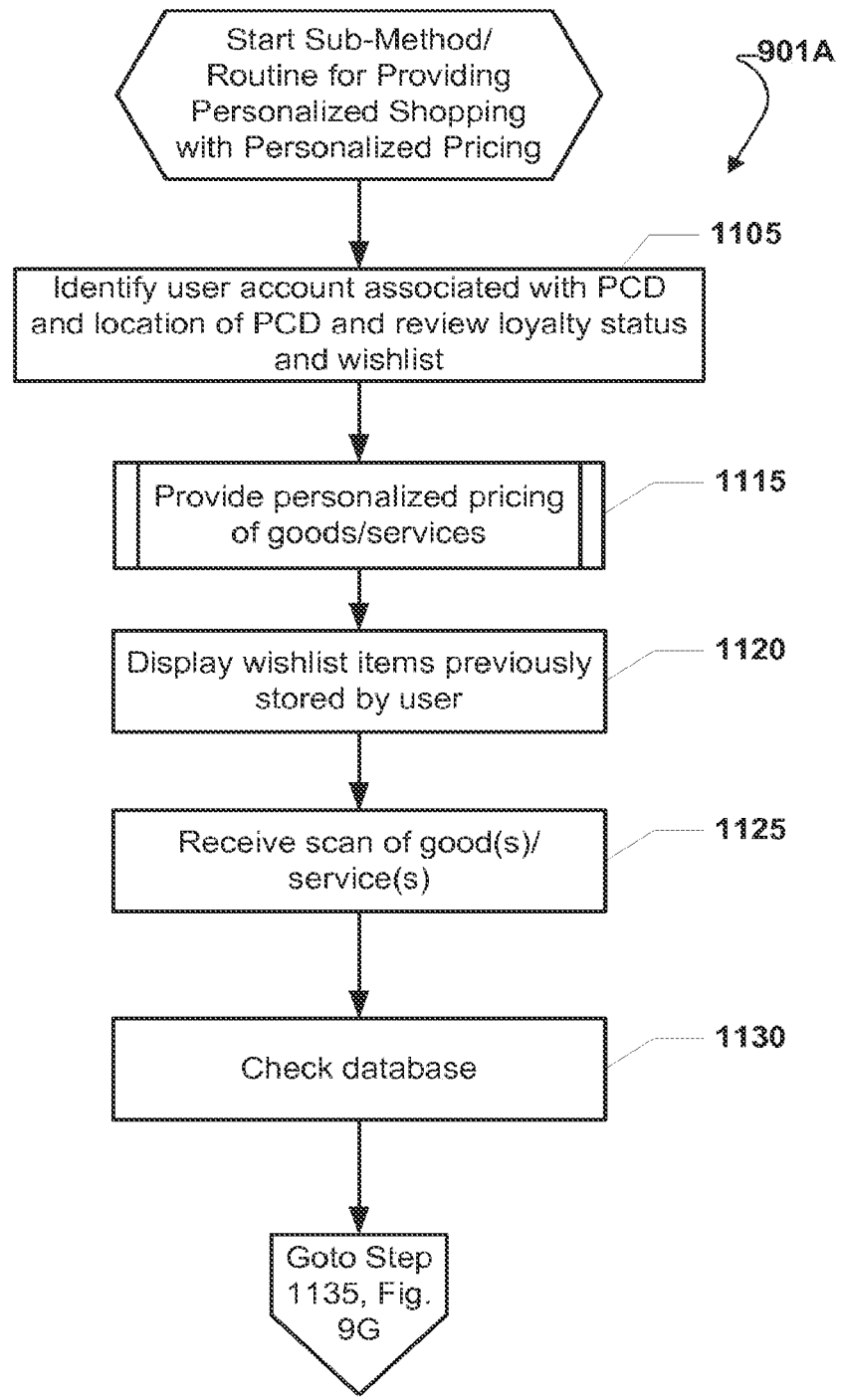
FIGS. 9F-9G are flowcharts illustrating a submethod or routine for providing a personalized shopping experience with personalized pricing for a PCD consumer.
Figure 9G:
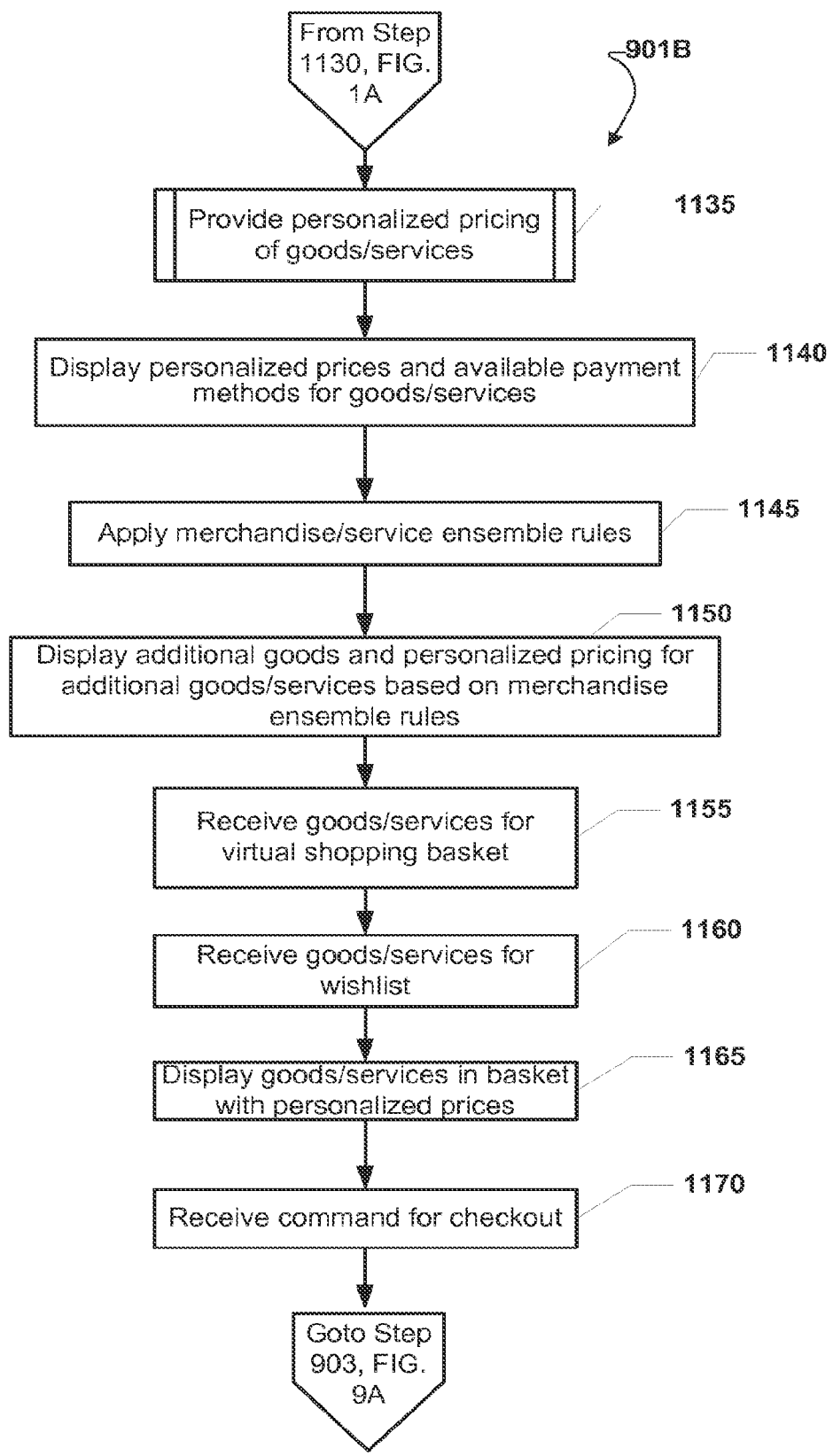

FIGS. 9F-9G are flowcharts 901A, 901B illustrating a submethod or routine 901 corresponding to FIG. 9A for providing a personalized shopping experience with personalized pricing for a PCD consumer. Block 1105 is the first block of method 901A. In block 1105, a user account associated with the PCD 100 and a location of the PCD 100 may be determined. Additionally, the loyalty status of the PCD consumer at this stage may be determined. Also, any wishlists stored by the PCD consumer may be reviewed by the personalized pricing module 742.

This block 1105 generally corresponds to when a PCD consumer checks-in via the check-in system 90A as illustrated in FIG. 1 in which the PCD consumer has a PCD 100 conduct a read of the machine-readable tag 124.

Once the PCD consumer has checked-in with his or her personalized shopping/payment application 113, the central mobile payment controller 50, via the personalized pricing module 742, may review the loyalty data stored in the loyalty system 24. Specifically, the payment controller 50 may issue a request for data to the loyalty system 24 using the client identifier. If the central mobile payment controller 50 determines that there is one or more matches between any loyalty account data received from the loyalty system 24 and the merchant identifier, then the central mobile payment controller 50 sends the loyalty account data over the communications network 142 to the portable computing device 100. The portable computing device 100 may display the amount of loyalty points earned and/or used for a particular transaction. If the operator of the PCD 100 has not been enrolled in the loyalty system 24 for a particular merchant, the central mobile payment controller 50 may facilitate the enrollment of the operator at this stage. The central mobile payment controller 50 may manage the received loyalty account data with the personalized pricing module 742. The personalized pricing module 742 may apply appropriate discounts and/or benefits to any items in a PCD consumer's wishlist based on the loyalty status of the PCD consumer. The application of the discounts and/or benefits to the wishlist may be based on the products/services 44 purchased by the operator of the PCD 100 in the past or they may be based on other factors or a combination of factors such as the number of re-occurrences of purchased products from the merchant.

The personalized pricing module 742 may compare wishlist data and prior purchase data with offer data as well as with the coupon data received from the loyalty system 24 and data already stored in a client profile. The personalized pricing module 742 at this stage may pull in or retrieve third-party offers from the offer/coupon system 22, and specifically, from a third-party offer generator 702 or manufacturer rebate database 718. These third-party offers and manufacture rebates may be applied to the current items in the wishlist of the PCD consumer and/or new items suggested by the offer/coupon system 22.

As described previously, a third-party offer generator 702 may comprise off-the-shelf units, such as, but not limited to, units/modules sold as of this writing by Catalina Marketing, Inc. The offers produced by the third-party offer generator 702 may comprise coupons targeted for a particular operator of PCD 100 based upon the products/services 44 that have been purchased and recorded by the product scanner 132 and the ECR 412. The offer/coupon system 22 may also generate private label offers for new credit cards such as a credit card bearing the name of the merchant, such as a WALMART™ or TARGET™ credit card. The personalized pricing module 742 may take the received third-party offer data and store it in a storage device corresponding to a particular profile of the operator of the PCD 100.

Next, in routine or submethod block 1115, the personalized pricing module 742 in combination with the rules engine 737 may provide personalized pricing of the goods/services present in the wishlist. If there is no wishlist at this stage, then this routine block 1115 may be skipped. Further details of routine block 1115 described below in connection with FIG. 9H. Routine block 1115 generally corresponds to FIGS. 7C-7D described above.

In block 1120, the personalized pricing module 742 communicates the wishlist of items associated with the PCD consumer to the personalized shopping/payment application 113 over the communications network 142. Then, the personalized shopping/payment application 113 may display the wishlist items previously stored by the PCD consumer. An exemplary wishlist in a screen 1100C is illustrated in FIG. 11C described below.

Next, in block 1125, the personalized shopping/payment application 113 may receive a scan of machine-readable codes, such as a barcode, associated with goods or services from the PCD 100. For a sample scan of a machine-readable code, see FIG. 2D described above. While FIG. 2D illustrates a scan of tag 124 for a check-in scenario, tag 124 may easily be affixed to a product or it may represent a service as understood by one of ordinary skill in the art. The personalized shopping/payment application 113 may relay data from a scan of the machine-readable code to the personalized pricing module 742. Subsequently, in block 1130, the personalized pricing module 742 may send a query comprising the scan data to the merchant enterprise database 16. The method 901A then continues to routine block 1135 of FIG. 9G.

FIG. 9G is a continuation flowchart corresponding to the flowchart of FIG. 9F which illustrates a method 901 for providing a personalized shopping experience with personalized pricing for a PCD consumer. The first block of method 901B is routine block 1135. Routine block 1135 generally corresponds with routine block 1115 described above. In other words, in this routine block 1135, the personalized pricing module 742 in combination with the rules engine 737 may provide personalized pricing of the goods/services that were just scanned by the PCD user. Further details of routine block 1135 described below in connection with FIG. 9H. Routine block 1135 generally corresponds to FIGS. 7C-7D described above.

Next, in block 1140, the personalized pricing module 742 relays the customized or personalized prices for the goods/services to the personalized shopping/payment application 113. The personalized shopping/payment application 113 then displays the personalized prices on the display device of the PCD 100. The personalized shopping/payment application 113 may also display available payment methods available to the PCD consumer. See FIG. 11A which illustrates an exemplary personalized price 1103 for a good 1101, comprising clothing such as jeans.

Next, in block 1145, the ensemble engine 781 may apply its rules as described above in connection with FIG. 7E such that additional goods and/or services may be displayed to the PCD consumer via the personalized shopping/payment application 113. The ensemble engine 781 may suggest additional products and/or services which may be of interest to the PCD consumer based on the rules.

In block 1150, the personalized shopping/payment application 113 may display the additional products and/or services on the display device of the PCD 100. See for example, the bottom half portion of the display 1100B of FIG. 11B described in further detail below. The additional products and/or services suggested by the ensemble engine 781 will also have personalized prices corresponding to the PCD user as generated by the personalized pricing module 742 in combination with the rules engine 737.

In block 1155, the personalized shopping/payment application 113 may receive goods and/or services for storage within the virtual shopping basket. An exemplary virtual shopping basket as illustrated in FIG. 11B described in further detail below.

In block 1160, the personalized shopping/payment application 113 may receive goods and/or services for the wishlist. An exemplary wishlist as illustrated in FIG. 11C described in further detail below. Next, in block 1165, the personalized shopping/payment application 113 may display the goods and/or services in the basket along with their personalized prices for review by the PCD consumer.

In block 1170, the personalized shopping/payment application 113 may receive a command for checkout that will allow the PCD consumer to purchase the goods and/or services present in the virtual shopping basket. The method 901B then continues to block 903 of FIG. 9A described above.

Figure 9H:
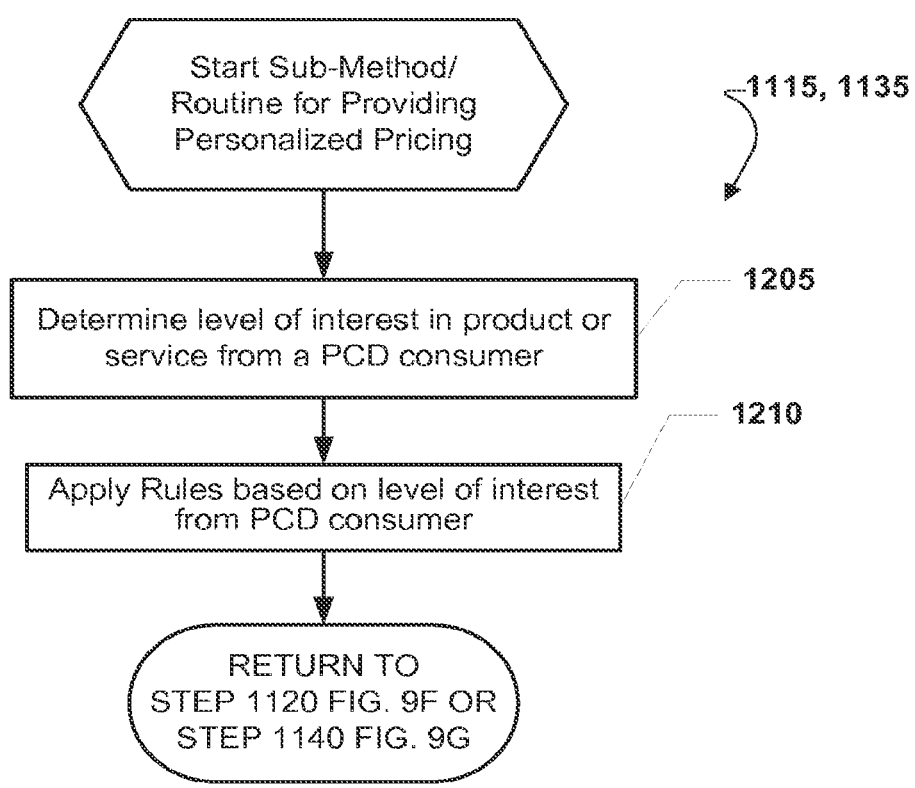
FIG. 9H is a submethod or routine for providing personalized pricing for a PCD consumer.

FIG. 9H is a submethod or routine 1115, 1135 for providing personalized pricing for a PCD consumer. Submethod or routine 1115, 1135 corresponds to submethod 901 as illustrated in FIGS. 9F-9G. This submethod or routine 1115, 1135 also corresponds with FIGS. 7C-7D that describe the relationship between the personalized pricing module 742 and the rules engine 737.

In block 1205, the personalized pricing module 742 in combination with the level of interest module 779 FIG. 7D may determine a level of interest of a PCD consumer for a product or service that is in a wishlist or has been scanned by the PCD 100. This block 1205 corresponds to the features and functions of the personalized pricing modules 142 and the level of interest module 779 described above in connection with FIG. 7D.

Next, in block 1210, the rules engine 737 may apply its rules based on the level of interest determined in block 1205 by the personalized pricing module 742 and the level of interest module 779. Block 1210 generally corresponds with FIG. 7C described above in which the rules engine 737 may apply its rules based on the level of interest and/or based upon loyalty tiers as illustrated in the product look-up ("PLU") table 777. The submethod then returns to either block 1120 of FIG. 9F or block 1140 of FIG. 9G.

Figure 10A:
FIG. 10A is a diagram of an exemplary machine-readable tag that may be positioned on a surface such as a table at a restaurant.

In the exemplary embodiment illustrated in FIG. 10A, a machine-readable tag 124 may be placed on a table in a restaurant so that it may be scanned in with a PCD 100 running the personalized shopping/payment application 113. The machine-readable tag 124 may be part of a menu or a display component that is very accessible to an operator of the PCD 100 when he or she is seated at a table in the restaurant.

In the exemplary embodiment illustrated in FIG. 10A, the machine-readable code 222 may be integral with an advertisement about the restaurant. The advertisement may also convey an offer which may be available to an operator of a PCD 100. To encourage patrons of the restaurant to utilize the system 101 instead of traditional card tokens associated with traditional forms of payment, the restaurant may entice the operators of PCDs 100 with special offers such as an offer for a free appetizer if the operator of the PCD 100 scans the machine-readable code 222 with the PCD 100 in order to indicate that the patron will likely pay his or her final bill with the PCD 100.

In response to scanning the machine-readable code 222 of FIG. 10, the central mobile payment controller 50 may generate a message and send the message to the display of the PCD 100 as illustrated in FIG. 10B.

FIG. 10B is a diagram of a screen 202I that shows relevant merchant information 228 and options 230 for an offer from a merchant that may be selected by an operator prior to the end of a transaction. The options 230 for the offer may include one or more choices of food products sold by the restaurant which is utilizing the system 101. In the exemplary embodiment illustrated in FIG. 10B, the choices of food products include, but are not limited to, free cheese sticks and free potato skins.

Once an option 230 is selected by an operator of the PCD 100, the PCD 100 may relay this information back to the store controller 410 which in turn relays this information upstream to the central mobile payment controller 50 as well as any server terminals in the restaurant. A waiter or service professional monitoring the terminal may be provided with a display of the appetizer selected by the operator of the PCD 100. Along these lines, in other exemplary embodiments, the operator of the PCD 100 may also select all of their food items from a menu by scanning in machine-readable codes from the menu or by keying-in codes or names of food items listed in the menu.

FIG. 10C is a diagram of a screen 202J that shows merchant information 228 relevant to a transaction and payment options 218B for a purchase along with a plurality of payment options that may be selected by an operator of the PCD 100. The payment options 218B comprising the plurality of payment options that may be selected by the operator is very similar to the payment options 218A described above in connection with FIG. 2G. As noted previously, one or more payment options may be selected by the operator with this screen 202J. The payment options may also provide or display any remaining balances available with credit card accounts as well as balances available for debit accounts so that the operator will know if there are sufficient funds in respect of accounts to pay for the final bill. Also with this screen 202J, a drop-down menu 229 may be provided for display and selection of an appropriate amount of tip corresponding to the service provided at the merchant such for the service provided by a waiter at a restaurant.

FIG. 10D is a diagram of a screen 202K that shows electronic receipt 220B that may be provided upon completion of a transaction with a merchant, such as a restaurant. The electronic receipt 220B of screen 202K is very similar to the electronic receipt 220A of screen 202H noted above. The electronic receipt 220B may list the food products purchased, as well as the tip for service selected, a total bill amount, and the payment method which was selected for the transaction.

FIG. 11A is a diagram of a screen 1100A that illustrates the results of a scanned machine-readable code for a good or product 1101 that has been scanned by a PCD 100 and its corresponding personalized price 1103. The screen 1100A may be produced by the personalized shopping/payment application 113 running on the PCD 100.

FIG. 11B is a diagram of a screen 1100B that illustrates a virtual shopping cart or basket 11 along with a suggested ensemble of related products 1113 by the ensemble engine 781. The screen 1100B may be produced by the personalized shopping/payment application 113 running on the PCD 100.

FIG. 11C is a diagram of a screen 1100C that illustrates a virtual wish list 1117 that may be updated by the PCD consumer with his or her PCD. The virtual wishlist may comprise a plurality of goods and/or services desired by a PCD consumer in connection with the future purchase. The screen 1100C may be produced by the personalized shopping/payment application 113 running on the PCD 100.

FIG. 12A is a diagram of a screen 1200A that shows merchant information 228 relevant to a transaction and a total bill for a purchase along with a plurality of offers 230 which were generated by a tender steering algorithm executed by the tender steering module 744. In this exemplary embodiment, the options 230 were generated by the tender steering module 744 such as described above in connection with blocks 1020, 1045. Specifically, the tender steering module 744 of this embodiment generated a 10% off the purchase price if the operator of the PCD 100 uses a new merchant payment account that may be established relatively instantaneously with the portable computing device 100. The tender steering module 744 also produced a 5% off the purchase price if the operator of the PCD 100 utilizes a merchant branded gift card.

FIG. 12B is a diagram of a screen 1200B that shows merchant information relevant to a transaction and a total bill for a purchase along with a plurality of payment options 218B that may be selected by user and which were re-ordered by a tender steering algorithm 744. The payment options 218B may also be characterized as the ranked list of payment account types described above in connection with FIG. 9E and the tender steering module 744. As illustrated in FIG. 12B, the tender steering module 744 has presented the merchant gift card payment option first, the merchant branded payment account second, and another type of payment account third.

The final purchase price listed is $63.92. Meanwhile the balance remaining on the merchant branded gift card is $8 and the credit limit of the merchant payment account is listed as $1000. In this way, the operator of the PCD 100 may select the merchant branded gift card payment option to be used in combination with the merchant branded payment account. Such a selection of payment options, in some cases, would not require any interchange fees from the merchant. In fact, in some cases, the selection of these two payment options could provide rebates for the merchant as understood by one of ordinary skill the art. By controlling the sequence of display for the payment options, a merchant through the tender steering module 744 may influence or "steer" a consumer towards the payment options which are most beneficial to the merchant.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the scope of the disclosure, as defined by the following claims.

What is claimed is:

1. A method for providing a personalized shopping experience to a user of a portable computing device, the method comprising:
    sending credentials over a computer communications network;
    sending a merchant identifier corresponding to a merchant over the computer communications network from the portable computing device;
    sending a scan of a machine-readable code primarily associated with at least one of a primary good and a primary service;
    receiving a personalized price, for a consumer associated with the portable computing device, corresponding to the at least one primary good or primary service;
    receiving a suggestion of an additional good or service secondarily associated with the scanned machine-readable code; and
    displaying the personalized price and the suggestion with the portable computing device.

2. The method of claim 1, wherein the personalized price for the consumer is based on a level of interest in the good or service selected by the consumer.

3. The method of claim 2, wherein a level of interest in the good or service selected by the consumer is based on if a machine-readable code associated with the good or service has been scanned by the portable computing device.

4. The method of claim 3, wherein a level of interest in the good or service selected by the consumer is also based on if the product or service is contained within at least one of a wish list, a virtual shopping cart, and a virtual check out list.

5. The method of claim 3, wherein a level of interest in the good or service selected by the consumer is also based on if the product or service has been purchased previously by the consumer.

6. The method of claim 1, wherein the portable computing device may include a least one of a cellular telephone, a pager, a PDA, a smartphone, a navigation device, and a hand-held computer with a wireless connection or link.

7. The method of claim 1, further comprising receiving a selection of the personalized price with the portable computing device.

8. The method of claim 1, further comprising:
displaying one or more payment options for the personalized price.

9. The method of claim 8, further comprising:
displaying the potential payment options in an order by payment account types.

10. The method of claim 1, further comprising:
displaying the one or more preferred payment options in a ranked fashion that may favor a merchant on a display device of the personal computing device.

11. A computer system for providing a personalized shopping experience to a user of a portable computing device, the method comprising:
a processor for:
sending credentials over a computer communications network;
sending a merchant identifier corresponding to a merchant over the computer communications network from the portable computing device;
sending a scan of a machine-readable code primarily associated with at least one of a primary good and a primary service;
receiving a personalized price, for a consumer associated with the portable computing device, corresponding to the at least one primary good or primary service;
receiving a suggestion of an additional good or service secondarily associated with the scanned machine-readable code; and
displaying the personalized price and the suggestion with the portable computing device.

12. The system of claim 11, wherein the personalized price for the consumer is based on a level of interest in the good or service selected by the consumer.

13. The system of claim 12, wherein a level of interest in the good or service selected by the consumer is based on if a machine-readable code associated with the good or service has been scanned by the portable computing device.

14. The system of claim 13, wherein a level of interest in the good or service selected by the consumer is also based on if the product or service is contained within at least one of a wish list, a virtual shopping cart, and a virtual check out list.

15. The system of claim 13, wherein a level of interest in the good or service selected by the consumer is also based on if the product or service has been purchased previously by the consumer.

16. The system of claim 11, wherein the portable computing device may include a least one of a cellular telephone, a pager, a PDA, a smartphone, a navigation device, and a hand-held computer with a wireless connection or link.

17. The system of claim 11, wherein the processor is further operable for receiving a selection of the personalized price with the portable computing device.

18. The system of claim 11, wherein the processor is further operable for:
displaying one or more payment options for the personalized price.

19. The system of claim 11, wherein the processor is further operable for:
displaying the potential payment options in an order by payment account types.

20. The system of claim 11, wherein the processor is further operable for:
displaying the one or more preferred payment options in a ranked fashion that may favor a merchant on a display device of the personal computing device.

21. A computing system for providing a personalized shopping experience to a user of a portable computing device, the method comprising:
means for sending credentials over a computer communications network;
means for sending a merchant identifier corresponding to a merchant over the computer communications network from the portable computing device;
means for sending a scan of a machine-readable code primarily associated with at least one of a primary good and a primary service;
means for receiving a personalized price, for a consumer associated with the portable computing device, corresponding to the at least one primary good or primary service;
means for receiving a suggestion of an additional good or service secondarily associated with the scanned machine-readable code; and
means for displaying the personalized price and the suggestion with the portable computing device.

22. The system of claim 21, wherein the personalized price for the consumer is based on a level of interest in the good or service selected by the consumer.

23. The system of claim 22, wherein a level of interest in the good or service selected by the consumer is based on if a machine-readable code associated with the good or service has been scanned by the portable computing device.

24. The system of claim 23, wherein a level of interest in the good or service selected by the consumer is also based on if the product or service is contained within at least one of a wish list, a virtual shopping cart, and a virtual check out list.

25. The system of claim 23, wherein a level of interest in the good or service selected by the consumer is also based on if the product or service has been purchased previously by the consumer.

26. A computer program product comprising a computer usable medium having a computer readable program code embodied therein, said computer readable program code adapted to be executed to implement a method for providing a personalized shopping experience to a user of a portable computing device, said method comprising:

sending credentials over a computer communications network;

sending a merchant identifier corresponding to a merchant over the computer communications network from the portable computing device;

sending a scan of a machine-readable code primarily associated with at least one of a primary good and a primary service;

receiving a personalized price, for a consumer associated with the portable computing device, corresponding to the at least one primary good or primary service;

receiving a suggestion of an additional good or service secondarily associated with the scanned machine-readable code; and displaying the personalized price and the suggestion with the portable computing device.

27. The computer program product of claim 26, wherein the personalized price for the consumer is based on a level of interest in the good or service selected by the consumer.

28. The computer program product of claim 27, wherein a level of interest in the good or service selected by the consumer is based on if a machine-readable code associated with the good or service has been scanned by the portable computing device.

29. The computer program product of claim 28, wherein a level of interest in the good or service selected by the consumer is also based on if the product or service is contained within at least one of a wish list, a virtual shopping cart, and a virtual check out list.

30. The computer program product of claim 28, wherein a level of interest in the good or service selected by the consumer is also based on if the product or service has been purchased previously by the consumer.

* * * * *

UNITED STATES PATENT AND TRADEMARK OFFICE
CERTIFICATE OF CORRECTION

| | | |
|---|---|---|
| PATENT NO. | : 9,477,977 B2 | Page 1 of 1 |
| APPLICATION NO. | : 14/268779 | |
| DATED | : October 25, 2016 | |
| INVENTOR(S) | : Dessert et al. | |

It is certified that error appears in the above-identified patent and that said Letters Patent is hereby corrected as shown below:

In the Specification

Column 13, Line 1, the phrase, "portable competing device" should be changed to --portable computing device--.

In the Claims

Column 43, Line 37 of Claim 11, the phrase, "the method," should be changed to --the system--.

Column 44, Line 28 of Claim 21, the phrase, "the method," should be changed to --the system--.

Signed and Sealed this
Eighth Day of May, 2018

Andrei Iancu
*Director of the United States Patent and Trademark Office*